United States Patent [19]

Hayakawa et al.

[11] Patent Number: 4,547,178
[45] Date of Patent: Oct. 15, 1985

[54] CONTROL SYSTEM FOR AN AUTOMATIC TRANSMISSION FOR A VEHICLE

[75] Inventors: Yoichi Hayakawa; Shoji Yokoyama; Yasunobu Ito, all of Anjo, Japan

[73] Assignee: Fuji Medical Instruments Mfg. Co., Ltd., Osaka, Japan

[21] Appl. No.: 556,853

[22] Filed: Dec. 1, 1983

[51] Int. Cl.[4] .............................................. F16H 11/06
[52] U.S. Cl. ...................................... 474/11; 474/28; 74/867
[58] Field of Search ............... 474/11, 12, 28; 74/856, 74/868, 877, 867, 687, 863

[56] References Cited

U.S. PATENT DOCUMENTS

| | | | |
|---|---|---|---|
| 3,451,283 | 6/1969 | Rattunde | 474/28 X |
| 4,152,947 | 5/1979 | van Deursen et al. | 474/11 |
| 4,228,691 | 10/1980 | Smirl | 474/12 |
| 4,459,879 | 7/1984 | Miki et al. | 474/28 X |
| 4,475,416 | 10/1984 | Underwood | 474/28 X |

Primary Examiner—James A. Leppink
Assistant Examiner—Frank McKenzie
Attorney, Agent, or Firm—Koda and Androlia

[57] ABSTRACT

A control system for a belt drive continuously-variable speed automatic transmission (CVT) for a vehicle wherein the discharge speed of a working fluid from a hydraulic servomotor provided on an input pulley of CVT is restricted by a downshift control mechanism to prevent a slip produced at the time of kickdown. The downshift control mechanism comprises a downshift controlling solenoid valve, a reduction ratio control mechanism and an electric control circuit for controlling these elements, wherein at the time of the kickdown, the solenoid valve is deenergized to close a drain port for the hydraulic servomotor of the reduction ratio control mechanism, and at the time of the coastdown, the solenoid valve is energized to open the drain port for the hydraulic servomotor of the reduction ratio control mechanism.

7 Claims, 44 Drawing Figures

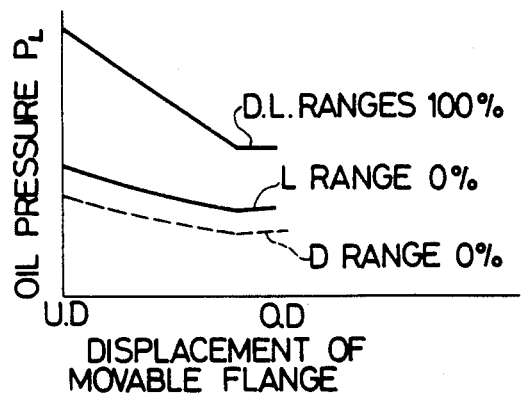
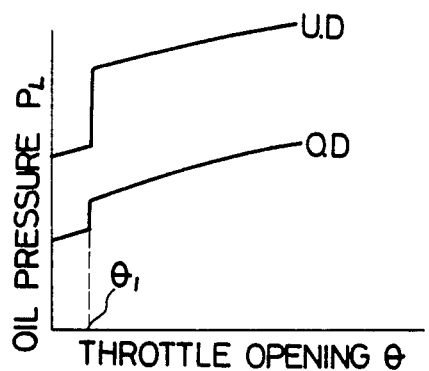
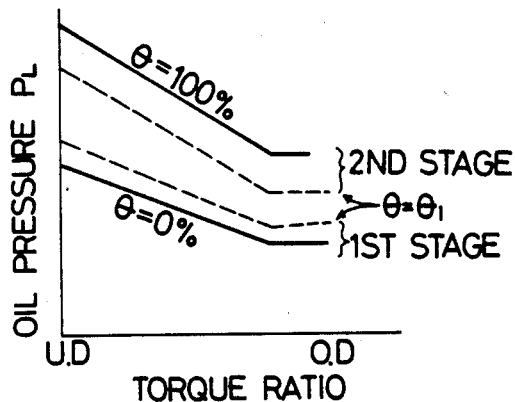

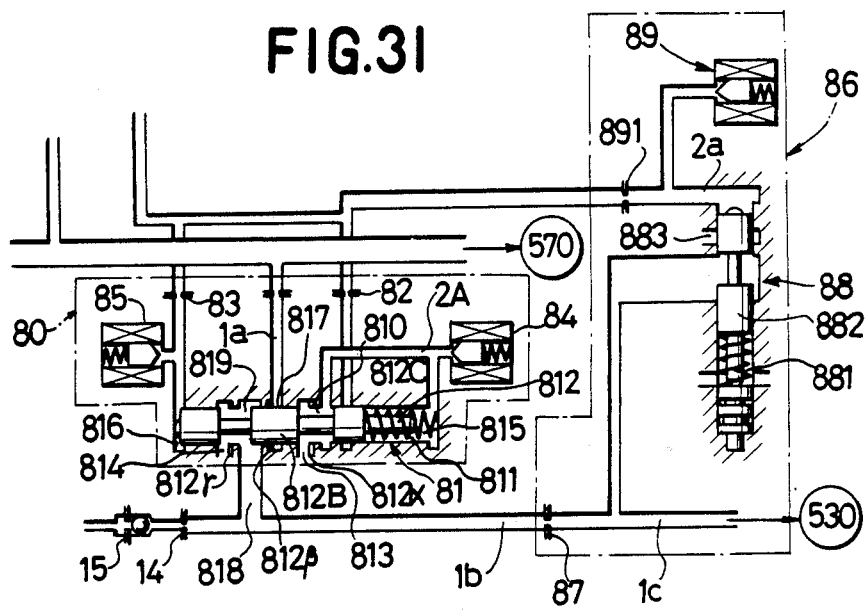
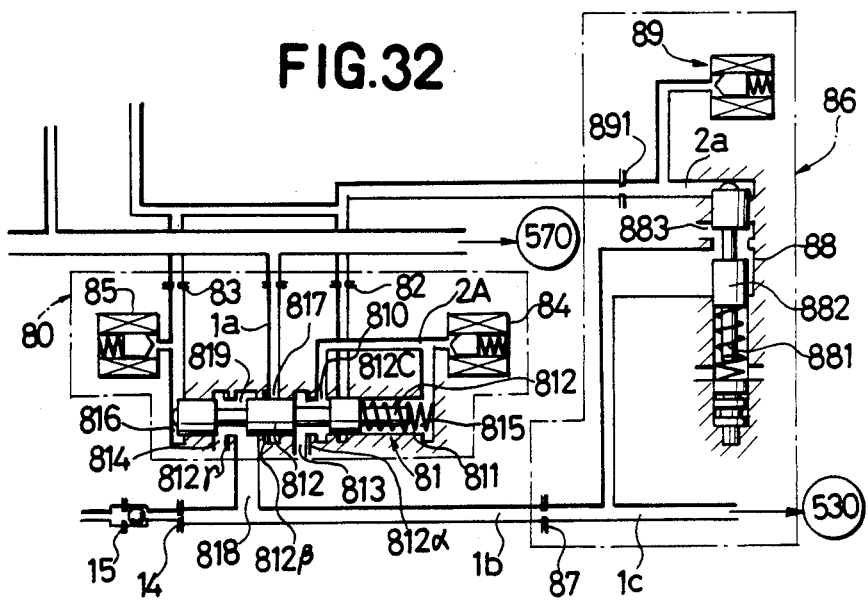

CONTROL SYSTEM FOR AN AUTOMATIC TRANSMISSION FOR A VEHICLE

BACKGROUND OF THE INVENTION

The present invention relates to a control system for an automatic transmission and more particularly to a control system which is provided within a hydraulic control system for controlling an automatic transmission for a vehicle using a belt drive continuously-variable speed transmission (CVT) to increase and decrease the reduction ratio of the belt drive continuously-variable speed transmission in response to the running conditions of the vehicle.

A belt drive continuously-variable speed transmission is employed as an automatic transmission for a vehicle in combination with a torque converter or a fluid coupling and a changeover mechanism including a forward drive and a reverse drive. such an automatic transmission is controlled by a hydraulic control system which employs the running conditions of the vehicle, such as the running speed of the vehicle, the number of revolutions of an input pulley, the degree of throttle opening and the like, as input signals and control the supply of a working fluid to as well as the discharge of a working fluid from the belt drive continuously-variable speed transmission, the hydraulic servo-motor of the changeover mechanism including a forward drive and a reverse drive and the fluid coupling, and the supply of lubricating oil to various parts of the automatic transmission. This hydraulic control system is provided to control, in response to the running conditions of the vehicle, the belt drive continuously-variable speed transmission comprising an input pulley and an output pulley variable in effective diameter by the hydraulic servomotor provided on an input shaft and an output shaft, respectively, and a V-belt extended between both the pulleys. As for one example, the hydraulic control system comprises a regulator valve for regulating the discharge oil pressure of an oil pump in response to the input oil pressure in connection with the throttle pressure, the running speed of the vehicle or the reduction ratio to release it as a line pressure, a throttle valve for regulating the supplied line pressure in response to the degree of throttle opening to release it as a throttle pressure, a reduction ratio detection valve for regulating the supplied line pressure in response to the running speed of the vehicle or the reduction ratio of the belt drive continuously-variable speed transmission to release the oil pressure in connection with the running speed of the vehicle or the reduction ratio, and a reduction ratio control valve provided with a spool actuated by two control oil pressures applied opposedly each other to supply said line pressure of the hydraulic servomotor of said input pulley and the discharge pressure of said hydraulic servomotor. An electronically-controlled automatic transmission for a vehicle further comprises two solenoid valves which are controlled by an electric control circuit which outputs in response to the running conditions of the vehicle such as the running speed of the vehicle, the number of revolutions of the input pulley, the degree of throttle opening and the like and regulate two control oil pressures of said reduction ratio control valve. However, the conventional reduction ratio control valve has been suffered from disadvantages in that since sufficient consideration to cope with the rapid increase in degree of throttle opening, when the so-called kickdown takes place whereby an accel pedal is rapidly trod to increase the reduction ratio to rapidly increase the output torque in order that the vehicle need be accelerated rapidly or need be run on a steep slope, the oip pressure of the hydraulic servomotor of the input pulley drops to approximately zero, tension of the V-belt temporarily weakens, the V-belt slips due to the reduction in frictional force between the V-belt and the pulley, and the pulley grips the V-belt when the shift is shifted to the upshift after termination of the kickdown shift, and therefore, a violent shock likely occurs.

SUMMARY OF THE INVENTION

It is a primary object of the present invention to provide a control system for an automatic transmission for a vehicle which can prevent the shock at the time of kickdown shift as described above.

It is a further object of the present invention to provide a control system for an automatic transmission for a vehicle which can prevent the delay of downshift at the time of coast downshift which likely occurs when the measures to prevent the shock at the time of kickdown shift as described above are taken, and which can complete downshift positively before the vehicle stops at the time of the stop resulting from the sudden coast downshift thereby positively preventing a short in output torque at the time of re-start generated due to the halfway of downshift at the time of sudden stop.

It is another object of the present invention to provide a control system for an automatic transmission which can vary the speed of pressure discharge of the hydraulic servomotor of the input pulley in response to the degree of throttle opening so that at the time of kickdown shift, the speed of discharge pressure of the hydraulic servomotor of the input pulley is delayed and at the time of coast downshift, the speed of discharge pressure of the hydraulic servomotor of the input pulley is increased thereby preventing the shock at the time of kickdown shift and to render the re-start at the time of coast downshift smoothly.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein:

FIGS. 9, 10 and 11 are graphs showing the characteristics of the line pressure provided by the pressure regulating valve, FIGS. 29 to 37 are hydraulic circuit views for explanation of operation of a downshift control mechanism.

DETAILED DESCRIPTION OF THE PREFERRED EMBODIMENTS

Figure 1A:
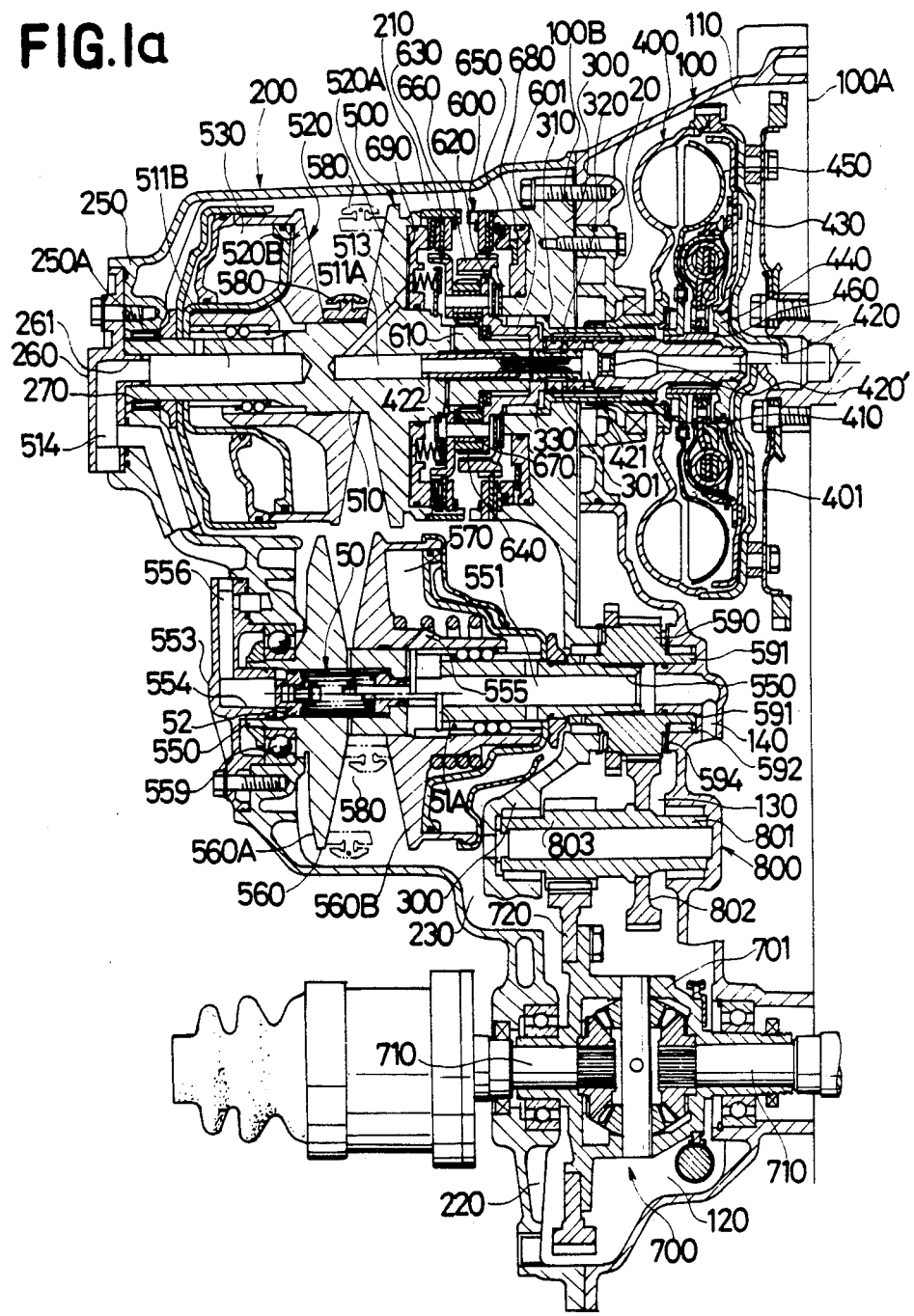
FIG. 1a is a sectional view of an automatic tramsmission for a vehicle in accordance with the present invention.

Referring to the accompanying drawing and first to FIG. 1, indicated by reference numeral 100 is a torque converter casing, indicated by reference numeral 200 is a transmission casing and indicated by reference numeral 300 is a center casing. These casings 100, 200 and 300 are interconnected with bolts with the center casing 300 disposed between the others to form the housing of an automatic transmission for a vehicle.

The torque converter casing 100 has an opening provided at a fixing surface 100A thereof joined to an internal-combustion engine, not shown, and including therein a converter room 110 for housing therein a torque converter or a fluid coupling 400 and the other opening provided at the other fixing surface thereof joined to the transmission casing 200 and including therein a differential gear room 120 for housing a differential gear 700 and an idle gear room 130 for housing an idle gear 800. The transmission casing 200 has an opening provided at a fixing surface joined to the torque converter casing 100 and including therein a transmission room 210 for housing a belt drive continuously-variable speed transmission mechanism (referred to simply as "belt drive transmission mechanism" hereinafter) 500, a differential gear room 220 facing the differential gear room 120 and an idle gear room 230 facing the idle gear room 130. Both ends of the casing 701 of the differential gear 700 and both ends of the shaft 801 of the idle gear 800 are supported pivotally in the torque converter casing 100 and the transmission casing 200 respectively. The center casing 300 is disposed within the transmission casing 200 and fixed to the fixing surface 100B formed in the wall of the converter room 110 of the torque converter casing 100 on the portion facing to the transmission room 210.

The fluid coupling 400 comprises a casing 401 and a pump, each being connected to the output shaft of the internal-combustion engine, an output shaft 420, a turbine 450 fixed to a hub 460 splined to the output shaft 420 and a piston 430 for a lock-up clutch connected to the hub 440 splined to the output shaft 420. The output shaft 420 of the fluid coupling 400 is supported rotatably in a sleeve 310 fitted in the center casing 300 through a plain bearing 320.

An oil pump 20 is affixed to the wall of the converter room 110 and the rotor thereof is driven by a hollow shaft 410 connected to the casing 401 of the fluid coupling 400 and disposed coaxially with the output shaft 420.

The belt drive transmission mechanism 500 comprises an input shaft 510 rotatably supported at both ends thereof in the center casing 300 and the transmission casing 200, an output shaft 550 arranged in parallel to the input shaft 510 and rotatably supported at one end thereof in the torque converter casing 100 and the center casing 300 and at the other end thereof in the transmission casing 200, an input pulley 520 consisting of a fixed flange 520A formed integrally with the input shaft 510 and a movable flange 520B axially slidably mounted on the input shaft 510, an output pulley 560 consisting of a fixed flange 560A formed integrally with the output shaft 550 and a movable flange 560B axially slidably mounted on the output shaft 550, hydraulic servomotors 530 and 570 mounted on the input shaft 510 and the output shaft 550 for moving the movable flanges 520B and 560B, respectively, and a V-belt 580 extended between the input pulley 520 and the output pulley 560 for transmitting torque from the input shaft 510 to the output shaft 550.

A planetary gear mechanism 600 is interposed between the output shaft 420 of the fluid coupling 400 and the input shaft 510 of the belt drive transmission mechanism 500. The planetary gear mechanism 600 comprises a hollow input shaft 601 formed integrally with the end portion of the output shaft 420 of the fluid coupling 400 in a diameter greater than that of the output shaft 420, an output shaft 610 formed integrally with the input shaft 510 of the belt drive transmission mechanism 500, a sun gear 670 formed integrally with the output shaft 610 on the circumference thereof, a planetary carrier 620 capable of being engaged with and disengaged from the fixed flange 520A of the input pulley 520 of the belt drive transmission mechanism 500 by means of a multiple disc clutch 630 held by the fixed flange 520A, a ring gear 660 capable of being engaged with and disengaged from the center casing 300 by means of a multiple disc brake 650 held by the center casing 300, planetary pinions 640 each being rotatably supported on the planetary carrier 620 and meshed with the sun gear 670 and the ring gear 660, a hydraulic servomotor 680 formed in the wall of the center casing 300 for operating the multiple disc brake 650 and a hydraulic servomotor 690 formed in the wall of the fixed flange 520A for operating the multiple disc clutch 630.

The input shaft 510 of the belt drive transmission mechanism 500 is disposed coaxially with the output shaft 420 of the fluid coupling 400. One end of the input shaft 510 nearby the fluid coupling 400 is relatively rotatably supported within the hollow input shaft 601 of the planetary gear mechanism 600 in a bearing, while the other end of the input shaft 510 is rotatably supported in a hole 250A of the wall 250 of the transmission casing 200. Oil passages 511A and 511B are drilled separately and individually in the input shaft 510. The oil passage 511A communicates with an oil passage 421 formed in the output shaft 420 of the fluid coupling 400 which is partitioned with a plug 420' through a sleeve 422, while the oil passage 511B communicates with an oil passage 514 formed in an end cap 260 fixed to the transmission casing 200 with bolts to close to hole 250A of the wall 250.

The idle gear 800 comprises the shaft 801 rotatably supported in the torque converter casing 100 and the center casing 300 at each end thereof in parallel to the output shaft 550 of the belt drive transmission mechanism 500, an input gear 802 fixed to the shaft 801 and engaging with an output gear 590 fixed to the output shaft 550 of the belt drive transmission mechanism 500 and an output gear 803 formed integrally with the shaft 801.

The differential gear 700 comprises the casing 701 fixedly holding an input gear 720 engaging with the output gear 803 of the idle gear 800, two output shafts 710 rotatably supported in the casing 701 and connected to the right and the left axle shafts respectively, bevel gears fixed to the output shafts 710 and intermediate bevel gears engaging with the bevel gears. The casing 701 is supported rotatably in bearings on the torque converter casing 100 and the transmission casing 200 with the output shafts 710 disposed in parallel to the shaft 801 of the idle gear 800.

The oil passage 511A formed along the axis of the input shaft 510 of the belt drive transmission mechanism 500 communicates with the hydraulic servomotor 690 by means of an oil passage 513 formed in the central portion of the fixed flange 520A of the input pulley 520 and serves as an oil passage to supply pressurized oil to and to discharge the pressurized oil from the hydraulic servomotor 690 through an oil passage, not shown, formed in the center casing 300, an oil passage 301 formed in the plain bearing 320, an oil hole drilled in the output shaft 420 of the fluid coupling 400 and the sleeve 422. The other oil passage 511B formed along the center axis of the input shaft 511 communicates with the hydraulic servomotor 530 by means of an oil hole drilled in the input shaft 511, splines formed in the outer circumference of the input shaft 511 and an oil passage formed in the central portion of the movable flange 520B. A cylindrical hollow projection 261 projecting inwardly of the transmission casing 200 is formed in the end cap 260 affixed to the wall 250 of the transmission casing 200. The projection 261 is fitted in the oil passage 511B of the input shaft 511. The input shaft 511 is supported at the end thereof in a bearing 270 fitted in the hole 250A formed in the wall 250. The oil passage 511B communicates with the oil passage 514 through the inside of the projection 261 to supply pressurized oil to and to discharge the pressurized oil from the hydraulic servomotor 530.

The output gear 590 mounted on one end of the output shaft 550 is formed integrally with a hollow support shaft 591. The support shaft 591 is supported rotatably at both ends thereof by the torque converter casing 100 and the center casing 300 respectively in roller bearing 592 and at the same time, is splined to the output shaft 550. Needle bearings 594 are interposed between both sides of the output gear 590 and the casings 100 and 300 respectively. The output shaft 550 is supported rotatably at the other end thereof by the transmission casing 200 in a ball bearing 559.

The output shaft 550 is formed in a hollow shaft. The valve body 52 of a reduction ratio detecting valve 50 is fitted in the hollow of the output shaft 550 at a position corresponding to the output pulley 560 and is secured at the position by means of a cylindrical hollow projection 554 formed in an end cap 553 fixed to the transmission casing 200 with bolts. The rest portion of the hollow of the output shaft 550 serves as an oil passage 551 for supplying the pressurized oil supplied from the oil passage 140 formed in the torque converter casing 100 to the hydraulic servomotor 570 through an oil hole 555 drilled in the movable flange 560B.

Figure 1B:
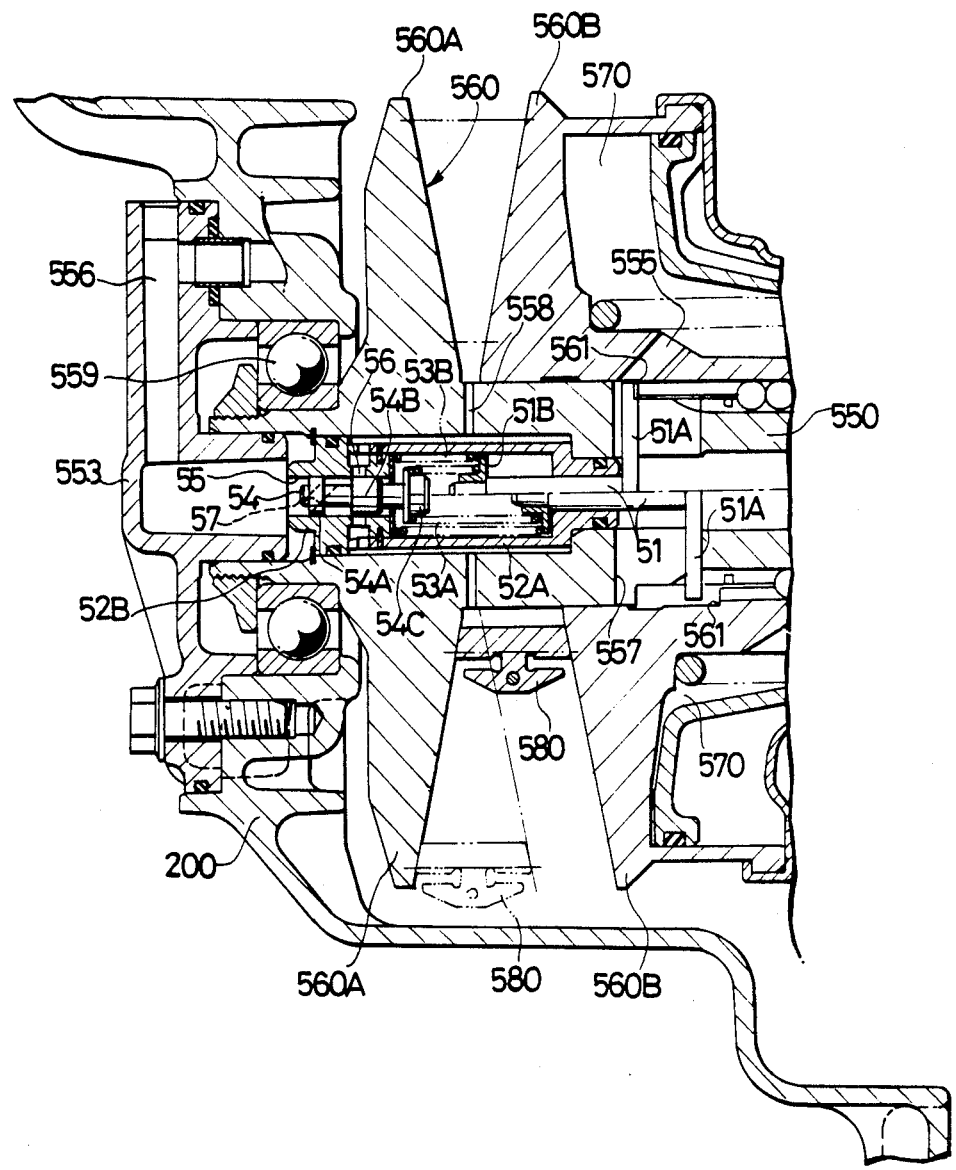
FIG. 1b is an enlarged view of a part of FIG. 1a, FIG. 2 is a circuit diagram of the hydraulic control system of the automatic transmission of FIG. 1a, FIG. 3 is a graph showing the characteristics of the output pressure of the reduction ratio control valve.

An enlarged view of the reduction ratio detecting valve 50 is shown in FIG. 1b. The valve body 52 includes two hollow cylinders 52A and 52B. A portion of the hollow cylinder 52B having a reduced outer diameter is fitted in the axial bore of the hollow cylinder 52A and fastened thereto with pins. A detecting rod 51 is axially slidably supported in the cylinder 52A and is provided fixedly at the free end thereof projecting from the cylinder 52A with an engaging pin 51A. The engaging pin 51A penetrates diametrically through a bore 557 formed in the output shaft 550 and the free end thereof engages with a stepped portion 561 formed in the inner circumference of the movable flange 560B. A spool 54 having two lands 54A and 54B and a head 54C arranged axially at predetermined intervals is axially slidably fitted in a port 55 formed axially in one end portion of the hollow cylinder 52B. A disc 51B is fixed to a stepped portion formed in the end portion of the detecting rod 51 extending within the cylinder 52A. Compression springs 53A and 53B are interposed between the disc 51B and the head 54C of the spool 54 and between the disc 51B and the end of the cylinder 52B respectively. A drain port 56 designed to be opened or closed by the land 54B of the spool 54 is formed in the cylinder 52B. An oil passage 57 is formed in the spool 54 to make the space between the lands 54A and 54B communicate with an oil passage 556 through the port 55. When the land 54B is displaced due to the change of the resilient force of the spring 53A to open the drain port 56, a part of the pressurized oil contained in the oil passage 556 is discharged through the oil passage 57, the drain port 56, a bore formed in the cylinder 52A, a clearance between the cylinder 52A and the output shaft 550 and a radial bore 558 formed in the output shaft 550 to produce a predetermined oil pressure within the oil passage 556.

Figure 2:
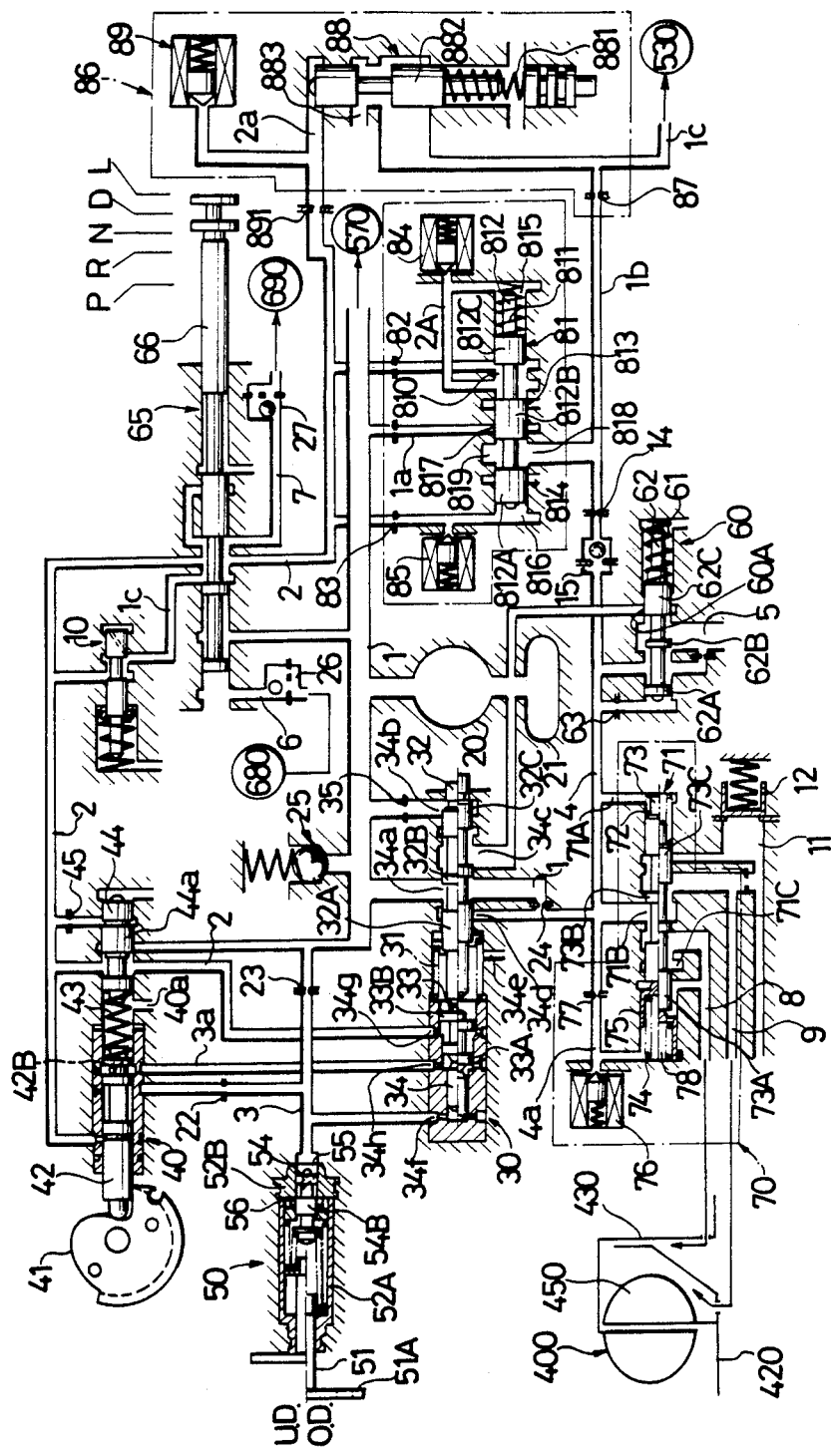

FIG. 2 is a circuit diagram of the hydraulic control system for the automatic transmission shown in FIG. 1a for a vehicle. In FIG. 2, there are shown a primary regulator valve 30, a throttle pressure valve 40, abovementioned reduction ratio detecting valve 50, a secondary regulator valve 60, a manual selector valve 65 controlled by the driver of the vehicle, a lock-up control unit 70 for controlling the lock-up clutch mechanism and a reduction ratio (torque ratio) control mechanism 80 for the belt drive transmission mechanism 500.

The hydraulic servomotor 570 of the belt drive transmission mechanism 500 is connected to a passage 1 through passages 140 and 551. The oil pump 20 pumps up oil from an oil pump 21 and supplies the oil to the passage 1. The hydraulic servomotor 530 is connected to a passage 1b of the reduction ratio control mechanism 80.

The primary regulator valve 30 regulates the oil pressure of the passage 1 to a line pressure in a manner as will be described below.

Figure 3:
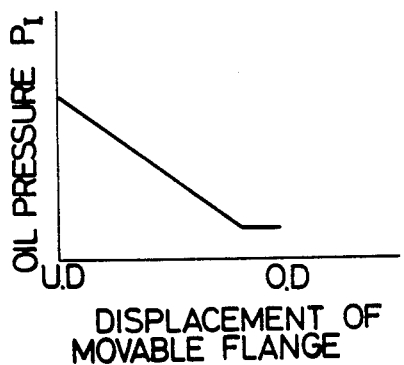

The port 55 of the reduction ratio detecting valve 50 formed in the end of the cylinder 52B communicates with a passage 3 branched from the passage 1 via an orifice 23 by means of the oil passage 55b. As the movable flange 560B of the output pulley 560 of the belt drive transmission mechanism 500 moves with respect to the fixed flange 560a, the detecting rod 51 is moved according to the displacement of the movable flange 560B due to the action of the resilient forces of the springs 53A and 53B acting on the detecting rod 51 of the detecting valve 50 and the engagement of the engaging pin 51A with the stepped portion 561 of the output shaft 550, so that the resilient force of the spring 53A is changed, whereby the spool 54 is caused to move. Then, the drain port 56 is opened or closed according to the displacement of the movable flnage 560B to create reduction ratio pressure $P_I$ of the characteristics as shown in FIG. 3 in the passage 3.

The throttle pressure valve 40 regulates the line pressure supplied thereto through the passage 1 according to the degree of throttle opening to supply oil at a first throttle pressure to the passage 2. When the degree of throttle opening is greater than a predetermined value $\theta_1$, the throttle valve 40 supplies also the reduction ratio pressure provided by the reduction ratio detecting valve 50 and applied thereto via the passage 3 and the orifice 22 as a second throttle pressure to a passage 3a.

The secondary regulator valve 60 is connected to a passage 4 which is connected to the passage 1 through an orifice 24 to regulate the oil pressure of the surplus oil exhausted from the regulator valve 30 in the passage 4 and to supply the surplus oil to the lubricating system of the automatic transmission through a passage 5 as a lubricant.

The manual selector valve 65 is operated by means of a shift lever provided nearby the driver's seat to distribute the line pressure in the passage 1 corresponding to the shift position of the manual selector valve 65.

The lock-up control mechanism 70 supplies the oil pressure in the passage 4 to the fluid coupling 400 corresponding to the input pressure applied thereto to control the engagement and disengagement operation of the lock-up clutch 430.

The reduction ratio control mechanism 80 supplies the oil pressure in the passage 1a connected to the passage 1 via a large diameter orifice 86 to the hydraulic servomotor 530 of the input pulley 520 corresponding to the input pressure applied thereto to control the reduction ratio (torque ratio) of the belt drive transmission mechanism 500.

A downshift control mechanism 86 is provided in the discharge oil passage 1b (the supply and discharge oil passage in the present embodiment) of the hydraulic servomotor 530 of the output pulley.

There are shown further a low modulator valve 10 provided in a passage 1c which communicates with the passage 1 when the manual selector valve 65 is shifted to the L-range position to regulate the line pressure to supply low modulator pressure to the passage 2, a relief valve 12 provided in an oil cooler passage 11, a relief valve 25 provided in the passage 1, a flow rate control valve 26 having a check valve provided in a supply passage 6 for supplying the line pressure to the hydraulic servomotor 680 of the multiple disc brake 650 of the planetary gear mechanism 600 and a flow rate control valve 27 having a check valve provided in a passage 7 for supplying the line pressure to the hydraulic servomotor 690 of the multiple disc clutch 630 of the planetary gear mechanism 600.

Figure 4:
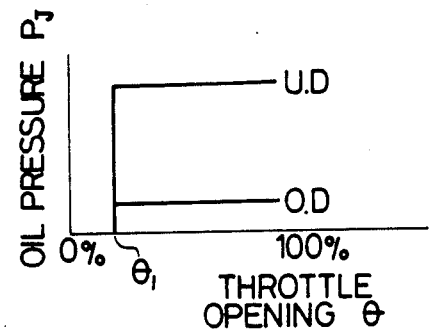
FIG. 4 is a graph showing the characteristics of the second throttle pressure provided by the throttle pressure valve.
Figure 5:
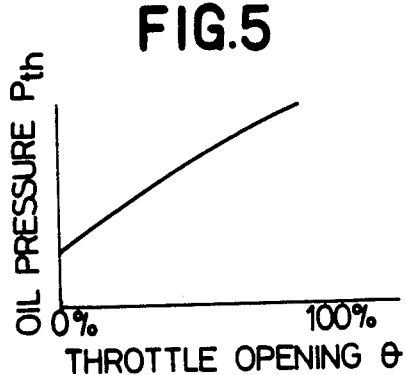
FIGS. 5 and 6 are graphs showing the characteristics of the first throttle pressure provided by the throttle pressure valve.
Figure 6:
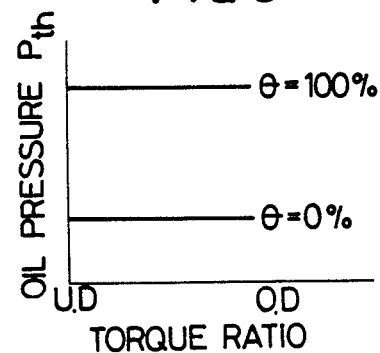

The throttle pressure valve 40 has a throttle plunger 42 disposed in contact with and adapted to be displaced by a throttle cam 41 linked with the accelerator pedal provided in the driver's cabin and a spool 44 arranged in series with the throttle plunger 42 with a spring 43 interposed therebetween. The plunger 42 and the spool 44 are displaced to the left with increase in the degree of throttle opening $\theta$. The plunger 42 connects passages 3 and 3a to create a second throttle pressure which is equivalent to the reduction ratio pressure $P_I$ in the passage 3a when the angle of rotation of the throttle cam 41 and the pressure in the passage 2 acting on the plunger 42 become values exceeding values corresponding to the predetermined value $\theta_1$ of the degree of throttle opening $\theta$. While the degree of throttle opening $\theta$ is less than the predetermined value $\theta_1$, the pressure in the passage 3a is exhausted from a drain port 40a through an oil passage 42B formed from one to the other side of a land of the plunger 42 to create a second throttle pressure $P_J$ in the passage 3a as shown in FIG. 4. The movement of the throttle cam 41 is transmitted to the spool 44 through the plunger 42 and the spring 43. The spool 44 is displaced according to the resilient force of the spring 43 corresponding to the degree of the throttle opening $\theta$ and the pressure in the passage 2 applied to the land 44a via an orifice 45 to change the area of the port connecting the passages 1 and 2, so that the first throttle pressure $P_{th}$ produced in the passage 2 is regulated as shown in FIGS. 5 and 6.

The regulator valve 30 comprises a spool 32 having lands 32A, 32B and 32C and biased by a spring 31 received by a disc attached to the left side of the spool 32, a first regulator plunger 33 disposed coaxially and in series with the spool 32 and having land 33A with a small diameter and a land 33B with a large diameter, a second regulator plunger 34 disposed coaxially, contiguously to and in series with the plunger 33, a port 34a connected to the passage 1, a port 34b to which the line pressure is supplied through an orifice 35, a drain port 34c, a port 34d for discharging surplus oil into the passage 4, a drain port 34e for draining oil leaking through the clearance between the lands and the wall of the valve body, an input port 34f for receiving the reduction ratio pressure $P_I$ from the passage 3, and input port $34_g$ for receiving the first throttle pressure $p_{th}$ from the passage 2 and a port 34h for receiving the second throttle pressure $P_J$ from the passage 3a.

Figure 7:
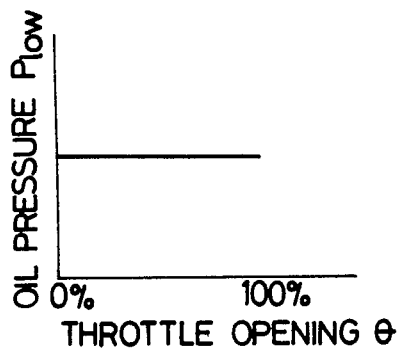
FIG. 7 is a graph showing the characteristics of the low modulator pressure provided by the low modulator valve.
Figure 8:
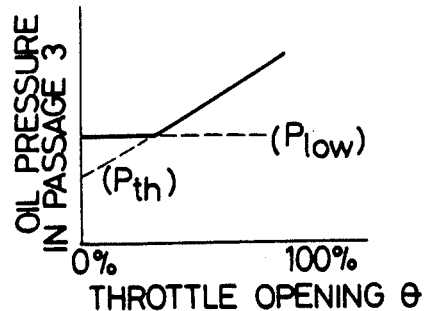
FIG. 8 is a graph showing the characteristics of the pressure produced in the passage 2.

The low modulator valve 10 generates a low modulator pressure $P_{low}$ as shown in FIG. 7 independently of the degree of throttle opening, when the manual selector valve 70 is placed in the L-range position. Both the low modulator valve 10 and the throttle pressure valve 40 are not provided with any drain passage for pressure regulation and are designed to perform pressure regulation by using the continuous draining of the oil of the throttle pressure $P_{th}$ from the reduction ratio control mechanism 80, which will be described hereinafter. Those valves 10 and 40 are arranged in parallel to each other. Accordingly, with the manual selector valve 70 placed in the L-range position, the higher pressure between the pressure $P_{low}$ and $P_{th}$ as shown in FIG. 8 is created in the passage 2 and hence, as shown in FIG. 9, the line pressure $P_L$ when the manual selector valve is placed in the L-range position and the degree of throttle opening is small is greater than the line pressure when the manual selector valve is placed in the D-range position.

The spool 32 of the regulator valve 30 is displaced by the reduction ratio pressure $P_l$ received through the port 34f and applied to the plunger 34, the first throttle pressure $P_{th}$ received through the port 34g and applied to the land 33B of the first plunger 33, the second throttle pressure $P_J$ received through the port 34h and applied to the land 33A of the first plunger 33, the resilient force of the spring 31 and the line pressure received through the port 34b connected to the passage 1 through an orifice 35 and applied to the land 32C to regulate the respective areas of the port 34a connected to the passage 1, the port 34d connected to the passage 4 and the drain port 34c, hence the rate of leakage of the pressurized oil from the passage 1, so that the line pressure $P_L$ of the characteristics shown in FIGS. 9, 10 and 11 is created.

It is necessary to downshift into the L-range to employ strong engine brake. In the belt drive transmission mechanism 500, downshift is attained by connecting the passage connected to the hydraulic servomotor 530 of the input pulley 520 to a drain passage to drain the oil chamber of the servomotor. However, when strong engine brake is applied, the input pulley 520 is caused to rotate at a high revolving rate and the oil pressure created by centrifugal force due to the rotation of the input pulley 520 is liable to impede draining the oil chamber of the servomotor. Accordingly, when quick downshift is required, it is necessary to raise the oil pressure supplied to the hydraulic servomotor 570 of the output pulley 560 above the normal pressure, which is particularly significant when the degree of throttle opening is small. Therefore, when the manual selector valve is placed in the L-range, the throttle pressure $P_{th}$ corresponding to the small degree of throttle opening $\theta$ is increased to raise the line pressure $P_L$ which is equivalent to the oil pressure supplied to the servomotor 570 of the output pulley 560.

The manual selector valve 65 is controlled with a shift lever provided nearby the driver's seat. The spool 66 of the manual selector valve 65 is movable through five positions which are parking range P, reverse range R, neutral position N, drive range D and low range L. In the respective shift positions, the passages 1c, 6 and 7 are connected to the passage 1 or 2 as shown in TABLE 1.

TABLE 1

|  | P | R | N | D | L |
|---|---|---|---|---|---|
| Line 7 | x | x | x | Δ | Δ |
| Line 6 | x | o | x | x | x |
| Line 1c | — | — | Δ | Δ | o |

In Table 1, symbols represent the conditions of those lines: "o" denotes connection to the line 1, "Δ" denotes connection to the line 2, "—" denotes blocked and "x" denotes drained. As shown in TABLE 1, in R-range the line pressure is supplied to the hydraulic servomotor 680 of the brake 650 of the planetary gear mechanism, while in D-range and L-range, the throttle pressure in the line 2 (or the low modulator pressure) is supplied to the hydraulic servomotor 690 of the clutch 630 to changeover between the forward drive condition and reverse drive conditions. The secondary regulator valve 60 has a spool 62 having lands 62A, 62B and 62C and biased at one end thereof with a spring 61. The spool 62 is displaced by the agency of the resilient force of the spring 61 and the oil pressure applied to the land 62A through an orifice 63 to regulate the pressure in the passage 4 through the passage 5 by changing the flow through an oil passage connecting the passages 4 and 5 and the flow through the drain port 60A and to supply the oil to the lubricating system. Excessive working fluid is drain through the drain port 60A.

The reduction ratio control mechanism 80 includes a reduction ratio control valve 81, orifices 82 and 83, an upshift solenoid valve 84 and a downshift solenoid valve 85. The reduction ratio control valve 81 has a spool 812 provided with a first land 812A, a second land 812B and a third land 812C and biased with a spring 811 provided contiguously to the third land 812C, end oil chambers 815 and 816 to which is supplied the throttle pressure or the low modulator pressure from the passage 2 through the orifices 82 and 83 respectively, an intermediate oil chamber 810 formed between the lands 812B and 812C, an oil passage 2A connecting the oil chambers 815 and 810, an input port 817 connected to the passage 1 supplying the line pressure through the large diameter orifice and the passage 1a and adapted to vary in the area according to the movement of the spool 812, a pressure regulating chamber 819 provided with an output port 818 connected to the hydraulic servomotor 530 of the input pulley 520 of the belt drive transmission mechanism 500 through the passage 1b, a drain port 814 for draining the oil chamber 819 corresponding to the movement of the spool 812 and a drain port 813 for draining the oil chambers 810 and 815 corresponding to the movement of the spool 812. The upshift solenoid valve 84 and the downshift solenoid valve 85 are connected to the oil chamber 815 and the oil chamber 816, respectively, of the reduction ratio control valve 81 and are operated by output signals provided by an electric control circuit, to drain the oil chambers 815 and 816 respectively, which will be described later.

Said passage 4 is connected to the output port 818 of the reduction ratio control mechanism 80 through a passage 13 provided with a check valve 15 internally having a check ball. The check ball of the check valve 15 allows the working fluid to flow from the passage 4 through the passage 13 toward the output port 818 and impedes the flow of the working fluid from the output port 818 into the passage 4. Accordingly, while a pressurized working fluid is supplied from the output port 818 of the reduction ratio control mechanism 80 through the passage 1b to the hydraulic servomotor 530 mounted on the input pulley 520 of the belt drive transmission mechanism 500, the pressurized working fluid in the passage 1b is not allowed to flow into the passage 4. On the contrary, while no pressure is created in the output port 818 by the reduction ratio control mechanism 80, the working fluid in the hydraulic servomotor 530 is drained from the drain port 814 through the passage 1b, while on the other hand, a pressure in the passage 4 regulated by the secondary regulator valve 60 is supplied to the passage 1b from the passage 4 through the passage 13, the orifice 14 and the check valve 15. Since only a low pressure which is sufficient to supply the working fluid to the parts requiring lubrication prevails within the passage 4, the pressure supplied from the passage 4 to the passage 1b does not affect the effect of draining the hydraulic servomotor 530 for changing the reduction ratio of the belt drive transmission mechanism 500, rather serves to maintain a low pressure within the hydraulic servomotor 530 to prevent the leak of air into the hydraulic servomotor 530. The orifice 14 and the check valve 15 may be interchanged in position for the same effect.

The downshift control mechanism 86 comprises an orifice 87 which is a flow limit mechanism provided in the oil passage 1b, a downshift control valve 88, and solenoid valve 89 for downshift control. The orifice 87 is provided in the oil passage 1b to limit, to a set value, a flow of a working fluid supplied to and discharged from the hydraulic servomotor 530 of the input pulley through the oil passage 1b. A spool 882 of the downshift control valve 88 is subjected to a spring load of a spring 881 from one position and subjected to a solenoid pressure of the oil passage 2a communicated with the oil passage 2 through the orifice 891 from the other position to be actuated. The solenoid valve 89 is mounted on the oil passage 2a and actuated by the output of the electric control circuit to changeover oil pressure of said oil passage 2a from a low level to a high level and vice versa.

The downshift control mechanism 86 operates as follows:

when the vehicle is rapidly accelerated by the driver or when the vehicle begins to be run on the steep slope, the accel pedal is rapidly trod to thereby rapidly increase the degree of throttle opening to increase the reduction ratio thus increasing the torque of the output shaft, which is so-called kickdown shift, then the solenoid valve 89 is placed in off-position and the spool 882 of the downshift control valve 88 is set downwardly as shown to interrupt a communication between the oil passage 1c and the drain port 883.

Figure 12:
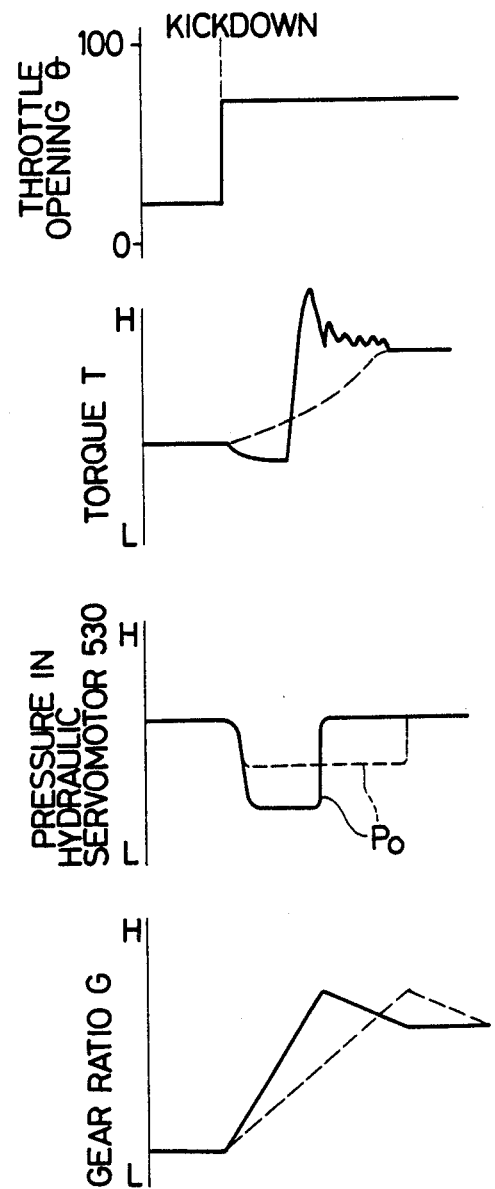
FIG. 12 is a graph for explanation of operation of a downshift control mechanism.

At this time, the oil pressure of the hydraulic servomotor 530 of the output pulley is discharged in order of the oil passage 1c, the orifice 87, the oil passage 1b and the drain port 814 of the reduction ratio control valve, and therefore, the speed of pressure-drop is limited, the tension of the V-belt resulting from the excessive drop of oil pressure in the hydraulic port 530 is prevented from being lowered, and the slip between the pulley and the V-belt is prevented from being produced. With this, in the present invention, the variations of conventional torque T, oil pressure Po of the hydraulic servomotor 530 and reduction ratio G as indicated by the solid lines when the kickdown takes place are changed into the characteristics as indicated by the broken lines in FIG. 12, thus reducing the shock.

However, where the orifice is provided in the oil passage 1b as described above, when the vehicle is suddenly stopped by the action of the orifice, the speed of pressure-discharge from the drain port 814 of the reduction ratio control valve is limited by the presence of the orifice, and the vehicle likely stops before completion of downshift in the belt drive continuously-variable speed transmission, thus failing to obtain a large torque due to the maximum reduction ratio at the time of re-start of the automobile to render the smooth re-start difficult.

Thereby, at the time of so-called coast downshift, wherein the downshift control valve 88 is provided in addition to the orifice 87 and retardation is effected under the condition of neutral or engine brake, the solenoid valve 89 is placed in ON-position and the spool of the downshift control valve 88 is set downward position as shown in the drawing whereby the oil passage 1c is communicated with the drain port 883. At this time, the oil pressure of the hydraulic servomotor 530 is exhausted in order of the oil passage 1c and the drain port 883, and the discharge of pressure is rapidly effected.

With this increase in speed of pressure-drop, even when the vehicle is suddenly stopped, the downshift of the belt drive continuously-variable speed transmission can be dropped positively to the maximum reduction ratio.

In the embodiment shown in FIGS. 2 and 16, the lock-up control mechanism 70 includes a lock-up control valve 71, an orifice 77 and a solenoid valve 76 for controlling the oil pressure in a passage 4a connected to the passage 4 through the orifice 77. The lock-up control valve 71 includes a spool having lands 73A, 73B and 73C of the same diameter and being biased by a spring 72 placed on the right side of the spool 73 and a sleeve 75 having a diameter greater than that of the lands of the spool 73, disposed in series with the spool 73 and biased by a spring 74 placed on the left side of the sleeve 75. In the embodiment shown in FIG. 16, the spool 73 is displaced by the agency of an oil pressure $P_1$ in the passage 4 acting on the land 73C via the port 71A connected to the passage 4 and the resilient force $F_{S1}$ of the spring 72 each acting on the spool 73 in one direction and the solenoid pressure $P_S$ in the passage 4a controlled by the solenoid valve 76 and acting on the sleeve 75 or the oil pressure $P_2$ in the clutch releasing passage 8 of the lock-up clutch acting on the land 73A through the port 71B and the resilient force $F_{S2}$ of the spring 74 each acting on the spool 73 in the other direction, whereby the connection of the passage 4 to the clutch releasing passage 8 or to the clutch engaging passage 9 of the lock-up clutch 430 is controlled. While an electric power is supplied to the solenoid valve 76 and the same is in ON-position, the valve element of the solenoid valve 76 opens the valve port to drain the passage 4a, and the spool 73 is retained at the left end position, so that the passages 4 and 9 are interconnected and the working fluid is allowed to flow from the oil passage 9 through the lock-up clutch 430 and the oil passage 8 to the drain port 71C, whereby the lock-up clutch 430 remains engaged. While the power supply to the solenoid valve 76 is interrupted and thereby the valve port of the same is blocked (OFF-position), the oil pressure in the passage 4a is maintained, the spool 73 is retained at the right end position and the passage 4 and the oil passage 8 are interconnected, so that the working fluid is allowed to flow from the oil passage 8 through the lock-up clutch 430 and the oil passage 9 to a passage 11 connected to an oil cooler, whereby the lock-up clutch 430 remained released.

The functions of the lock-up control mechanism 70 will be described hereinafter.

Figure 13:
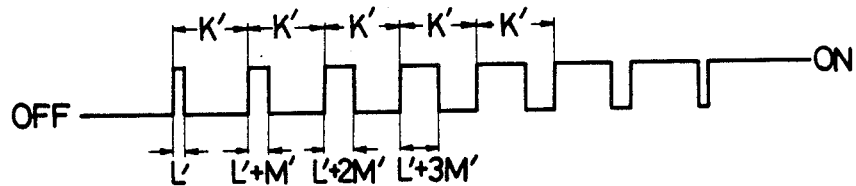
FIG. 13 is a waveform chart of duty control.
Figure 14:
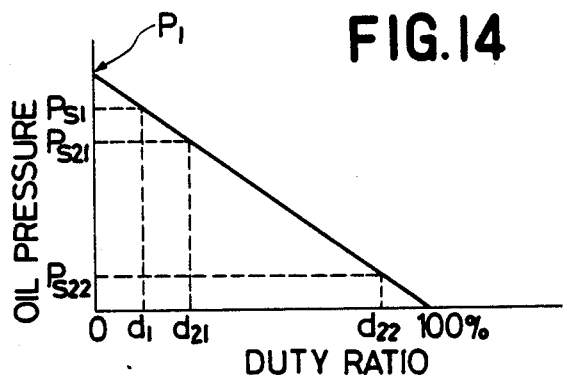
FIG. 14 is a graph showing the characteristics the solenoid pressure $P_S$.
Figure 15:
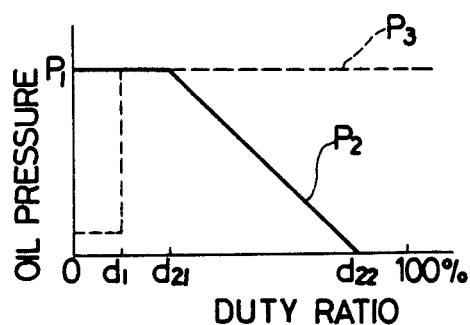
FIG. 15 is a graph showing the characteristics of the releasing pressure $P_2$ and of the engaging pressure $P_3$ which are applied to the lock-up clutch.

In an automatic transmission equipped with a lock-up clutch, a shock is produced upon the engagement of the lock-up clutch due to the difference in the revolving rate between the pump side and the turbine side of the torque converter or the fluid coupling during the course of the engagement of the lock-up clutch, which affect comfortableness adversely. Accordingly, in a conventional automatic transmission of this type, the lock-up clutch is engaged while the vehicle is running at a higher running speed. Where the difference in the revolving rate between the pump side and the turbine side of the torque converter or the fluid coupling is smaller and hence only a reduced shock is produced upon the engagement of the lock-up clutch. In such a manner of engaging the lock-up clutch, however, the engagement of the lock-up clutch is required to be performed while the vehicle is running at a higher running speed and the engagement of the lock-up clutch is impossible while the vehicle is running at a lower running speed and hence the effect of the lock-up clutch can not be exhibited sufficiently. According to the present invention, there is provided a lock-up control mechanism capable of regulating the lock-up clutch engaging pressure and the lock-up clutch releasing pressure in engaging the lock-up clutch to mitigate the shock of engagement of the lock-up clutch. The present invention is similar to prior art in respect of the lock-up clutch being released with the solenoid valve 76 in OFF-position and the lock-up clutch being engaged with the solenoid valve 76 in ON-position. However, according to the present invention, the solenoid valve is not merely placed in OFF-position or in ON-position to engage or to release the lock-up clutch, but the solenoid valve is placed in OFF-position - duty increase - ON-position to regulate the engagement of the lock-up clutch. In controlling the lock-up clutch from released state to engaged state, a solenoid pressure $P_S$ of characteristics shown in FIG. 14 is created in the solenoid oil passage 4a by providing a periodic signal of incremental duration periods as shown in FIG. 13 for the solenoid valve 76. The spool 73 is controlled by the solenoid pressure $P_S$, so that the releasing pressure $P_2$ in the lock-up clutch releasing passage 8 and the supply pressure $P_3$ in the lock-up clutch engaging passage 9 vary as shown in FIG. 15 relatively to the solenoid duty. When the duty is within a range of 0% ($P_S = P_1$) to d1% ($P_S = P_{S1}$), the valve is controlled in a state between the state of FIG. 16A and that of FIG. 16B.

Figure 16A:
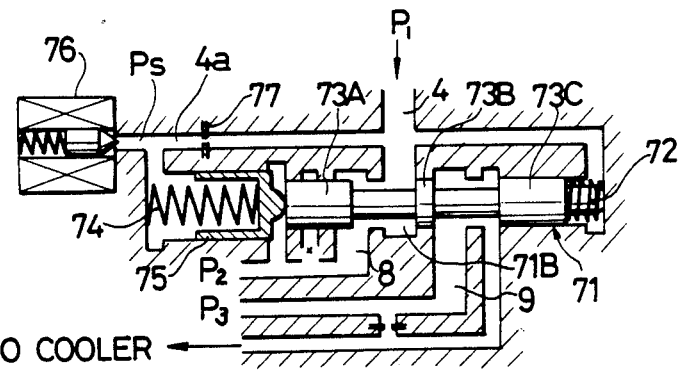
FIGS. 16A, 16B, 16C and 16D are views explaining the operation of the lock-up control valve employed in a first embodiment.
Figure 16B:
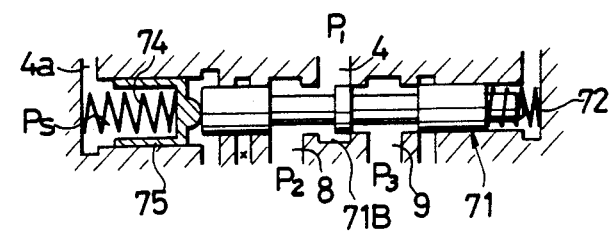
Figure 16C:
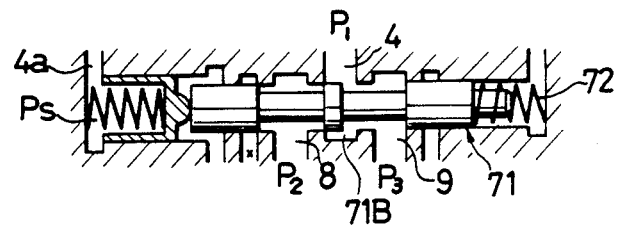
Figure 16D:
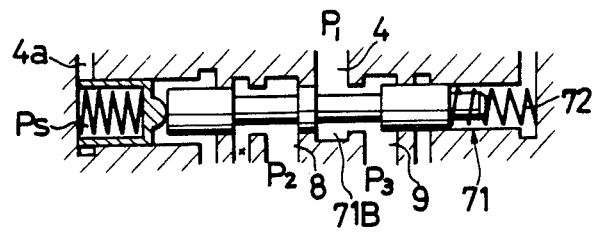

When the duty is within a range of d1% ($P_S = P_{S1}$) to d 21% ($P_S = P_S21$), the valve is controlled in a state between the state of FIG. 16B and that of FIG. 16C. When the duty is within a range of d21% ($P_S = P_S21$) to d22% ($P_S = P_S22$), the valve is controlled in a state between the state of FIG. 16C and that of FIG. 16D. When the duty is within a range of d22% ($P_S = P_S22$) to 100% ($P_S = 0$), the state of FIG. 16D is established.

Figure 17:
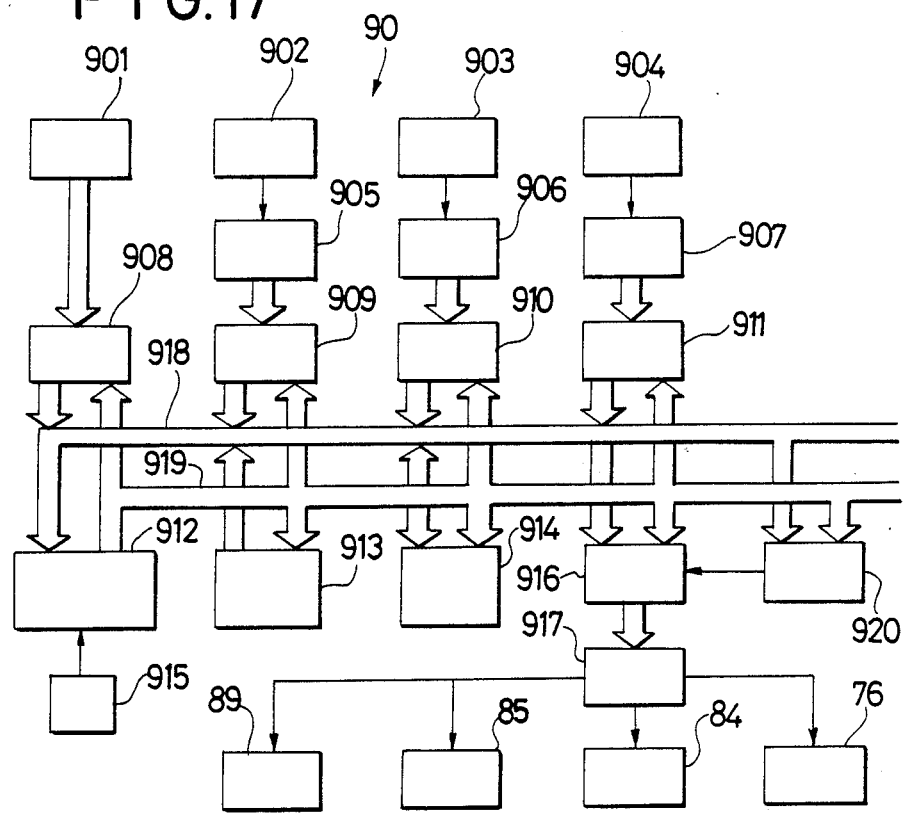
FIG. 17 is a block diagram of an electric control circuit.

FIG. 17 shows the structure of an electric control circuit 90 for controlling the solenoid valve 76 of the lock-up clutch control mechanism 70, the solenoid valve 84 for upshift and solenoid valve 85 for downshift in the reduction ratio control mechanism 80, and the solenoid valve 89 for controlling the downshift in the downshift control mechanism 86 in the hydraulic control system shown in FIG. 2. The electric control circuit 90 includes a shift lever switch 901 by which is detected if a shift cover is shifted to what position, P, R, N or L, a rotational speed sensor 902 for detecting a rotational speed of an input pulley A, a running speed sensor 903, a throttle sensor 904 for detecting the degree of throttle opening, a speed detection and processing circuit 905 for converting an output of the rotational speed sensor 902 into a voltage, a running speed detection circuit 906 for converting an output of the running speed sensor 903 into a voltage, a circuit 907 for detecting and processing the degree of throttle opening for converting an output of the throttle sensor 904 into a voltage, input interfaces 908–911 for each of the sensor, a central processing unit (CPU) 912, a read on memory (ROM) 913 for storing programs for controlling the solenoid valves 76, 84, 85 and data necessary for the control, a random access memory (RAM) 914 for temporarily storing input data and parameters necessary for the control, a clock 915, an output interface 916, and a solenoid output driver 917 for changing an output of the output interface 916 into working outputs of the downshift solenoid valve 85, upshift solenoid valve 84, lock-up controlling solenoid valve 76 and downshift controlling solenoid valve 88. The input interfaces 908–911 are communicated with the CPU 912, ROM 913, RAM 914 and output interface 916 by a data bus 918 and an address bus 919.

Next, operation of the lock-up control mechanism 70, the reduction ratio control mechanism 80 and the downshift control mechanism 86, which are controlled by the electric control circuit 90, will be described with reference to FIGS. 18 to 28.

The present embodiment shows an example in which the number N of revolutions of pulley on the input side is controlled by the electric control circuit 90 so that the best fuel consumption cost is attained at the degree of throttle opening $\theta$.

Figure 18:
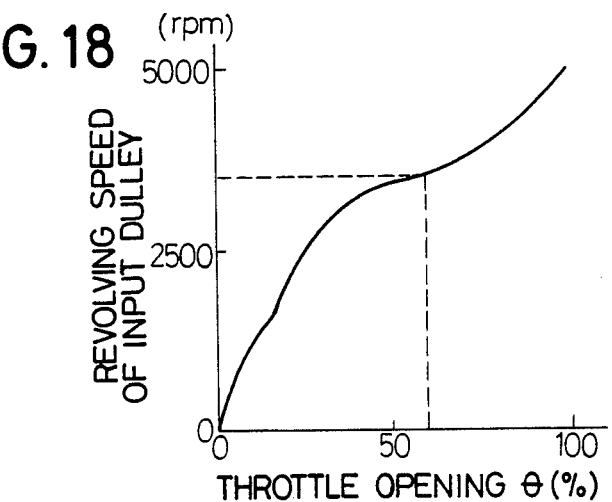
FIG. 18 is a graph showing the number of revolutions of the best ,fuel cost input pulley.
Figure 19:
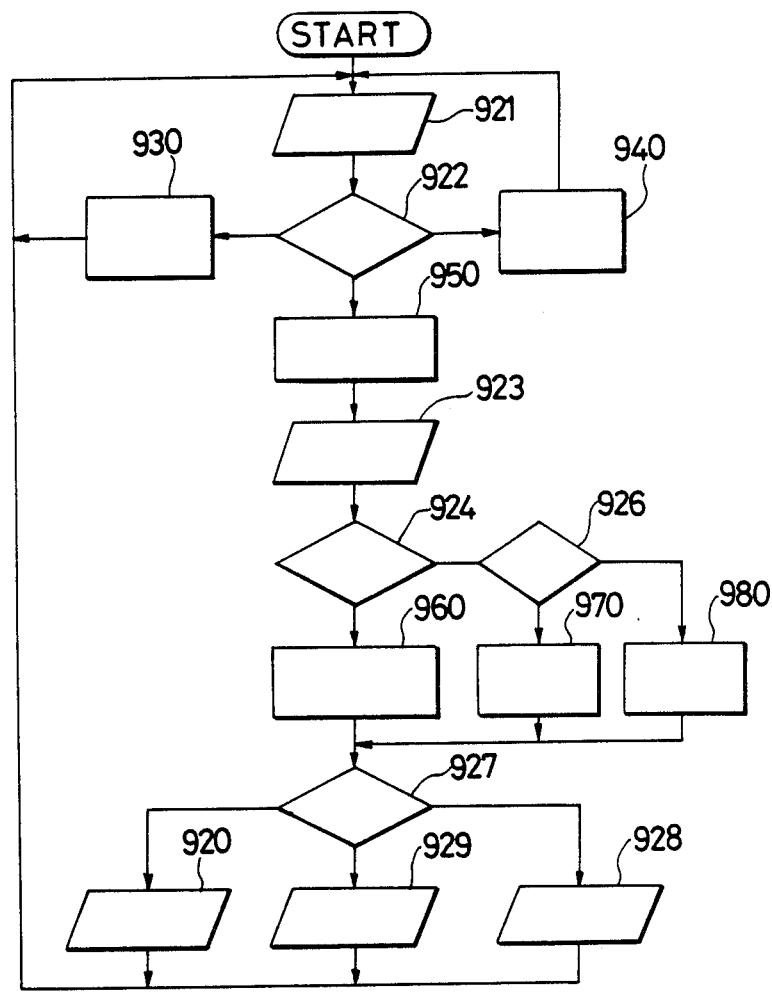
FIGS. 19, 20, 21, 22, 23 and 25 are flow charts for explanation of operation.
Figure 20:
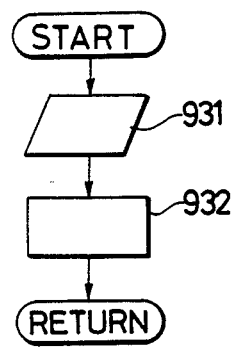
Figure 22:
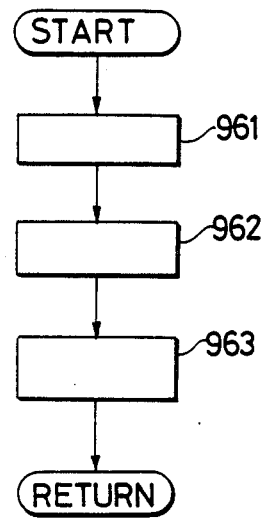

Controlling of the reduction ratio control mechanism 80 is effected in such a way that the number of revolutions of input pulley for the best fuel consumption cost shown in FIG. 18 is compared with the actual number of revolutions of input pulley whereby the increase and decrease in change gear ratio between the input and output pulleys are carried out by the action of two solenoid valves 84, 85 provided on the reduction ratio control mechanism 80 to coincide the actual number of revolutions of input pulley with the number of revolutions of input pulley for the best fuel consumption cost. FIG. 19 shows a flow chart of the whole control of the number of revolutions of input pulley.

Figure 21:
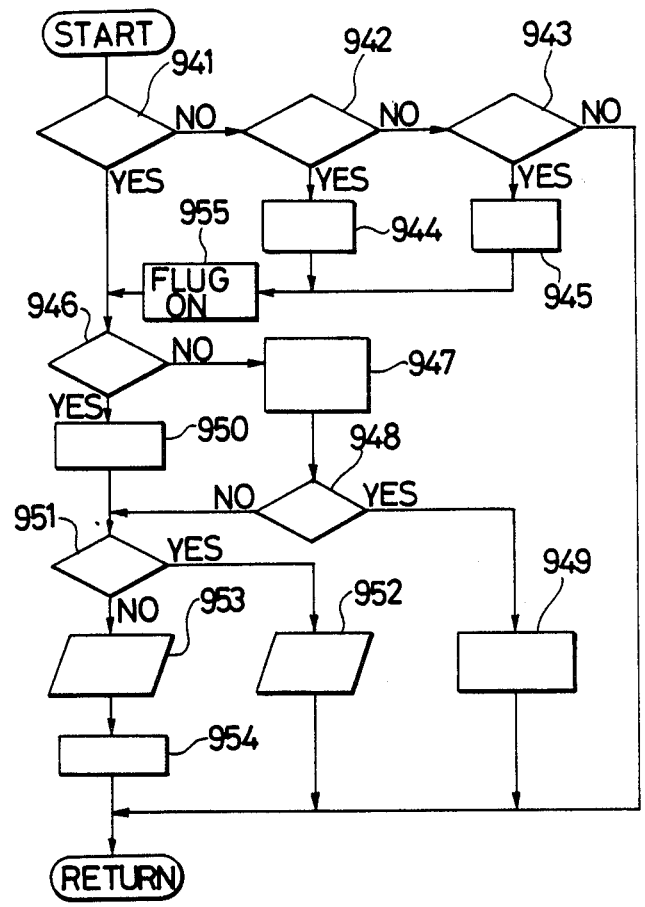

After the degree of throttle opening $\theta$ has been read at 921 by the throttle sensor 904, the lever position is discriminated at 922 by the shift lever switch 901. If the shift lever is in P-position or N-position as the result of the discrimination, both the solenoid valves 84 and 85 are placed in OFF-position (931) by the P- and N-position processing 930 subroutine shown in FIG. 20, and the P or N state is stored in RAM 914. (932) The neutral state of the input pulley A is then obtained. The lock-up control is accomplished in such a way that a pulse width in a period $K^*$ is represented by $L^* + nM^*$ ($n = 1.2.3..$. ), and the pulse whose width gradually increase is added to the solenoid valve 76 of the lock-up control mechanism 70 shown in FIG. 16. If the solenoid valve 76 is duty-controlled in the manner as described, an oil pressure Ps to be regulated corresponding to the duty is produced in the oil chamber 78 at the left end in the figure of the lock-up control valve 71. FIG. 21 shows a program flow chart for accomplishment of control by parameters $K^*$, $L^*$ and $M^*$ of waveforms shown in FIG. 12. FLUG is discriminated at 941 to see if the lock-up control is being processed, and if it being processed, processing is continued, and if it is not being processed, discrimination 942 of presence or absence of change from P-position or N-position to R-position and descrimination 943 of presence or absence of change from N-position to D-position are carried out in the shift lever switch 901. If either change occurs, the parameters $K^*$, $L^*$ and $M^*$ corresponding thereto are set at 944 or 945 to place FLUG which indicates the state of the lock-up control processing in the ON-state (955). If neither change occurs, the step is returned and the lock-up control processing is not effected. In the lock-up control, discrimination 946 is made if a parameter K which discriminates the termination of the period $K^*$ is a positive value or not. If K is not positive value, K is set to K, L to $L^* - M^*$ and L to $L^*$ (947). Distrimination 948 is made if L is less than 0, and if L is less than 0, FLUG is set to OFF (949) and the step is returned. In this case $L \leq 0$, and setting of FLUG to OFF means that the whole lock-up control processing has been terminated.

In discrimination 946, if the parameter K which discriminates the termination of the period K* is a positive value, K−1 is set to K (950). Discrimination 948 is made where the condition L ≦0 is not present, and discrimination 951 is made if a parameter L which discriminates the termination of ON time in the period K is L=0 or not. If the condition L=0 is present, OFF command 952 of the solenoid valve 74 is provided, and if the L is a value other than 0, ON command 953 of the solenoid valve 74 is provided, after which L−1 is set to L (954) and the step is returned. Alternatively, similar lock-up control processing can be effected by using a programmable timer shown at 920 in FIG. 17.

Following the lock-up control processing 950, the actual number N of revolutions of input pulley is read at 923 by the rotational speed sensor 902 of the input pulley. Next, discrimination 924 is made if the degree of throttle opening θ is 0 or not, and if the condition θ=0 is present, a stored address of data of the number N of revolutions of input pulley corresponding to the degree of throttle opening is set at 961 in order that the number N* of revolutions of input pulley for the best fuel cost corresponding to the degree of throttle opening θ of FIG. 18 stored in the ROM 913 as data in accordance with the subroutine shown in FIG. 21 is set at 960, and the data of N* is read (962) from the set address to temporarily store (963) the data of N* in the data storing RAM 914.

Figure 23:
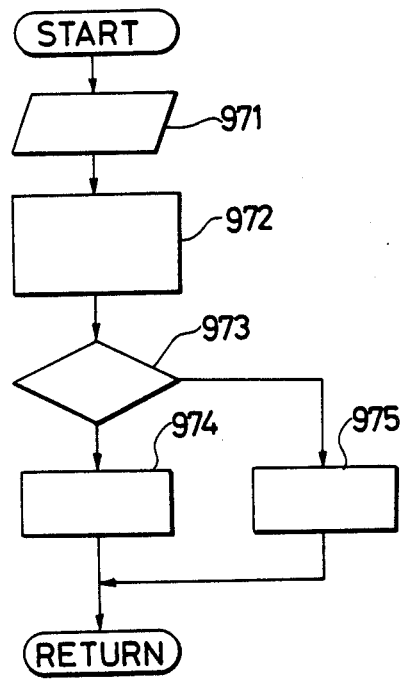
Figure 24:
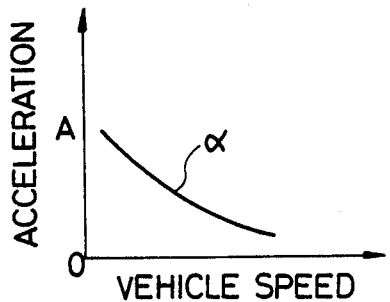
FIG. 24 is a characteristic graph of the running speed of a vehicle and acceleration.

Next, comparison (927) is made between the actual number N of revolutions of input pulley and the nubmer N* of revolutions of input pulley for the best fuel cost. If the condition N <N* is present, actuation command 928 of the solenoid valve 84 for upshift is provided; if the condition N>N* is present, actuation command 929 of the solenoid valve 85 for downshift is provided; and if the condition N=N* is present, OFF command 920 of both solenoid valves 84 and 85 is provided. When the throttle is fully closed with θ=0, discrimination 926 is made if the shift lever is set to D-position or L-position in order to judge the necessity of the engine brake, and engine brake control 970 or 980 is effected, if necessary. In the engine brake processing 970 at D-position, the running speed V is read at 971 by the running speed sensor 903, as shown in FIG. 23, and at that time, acceleration α is calculated (972), after which discrimination 973 is made if the acceleration α is the acceleration A suitable for the running speed. If the condition α>A is present, N* is set to a value greater than N in order to effect the control 974 of the downshift, and thereafter the step is returned. If the condition α≦A is present, N* is set to the number N* of revolutions of input pulley for the best fuel cost corresponding to the degree of throttle opening θ and thereafter the step is returned. The relationship between the running speed and the suitable acceleration A can be obtained by experiments or calculations with respect to each of vehicles, which is shown in the graph of FIG. 24.

Figure 25:
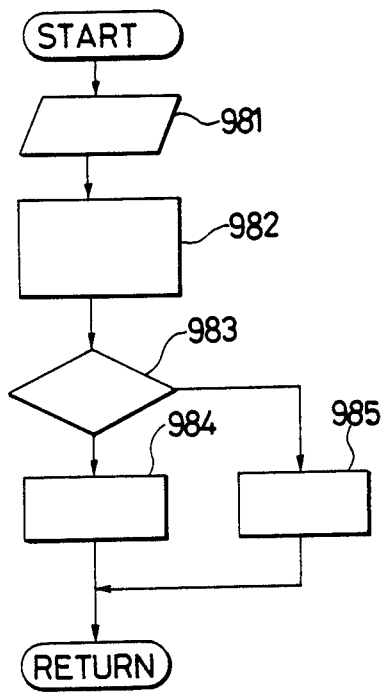
Figure 26:
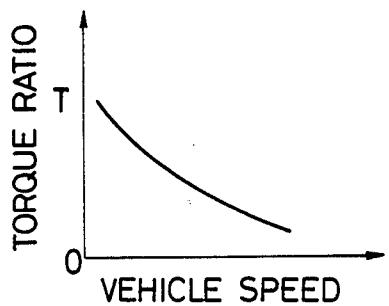
FIG. 26 is a characteristic grapgh of the running speed of a vehicle and torque ratio T.

In the engine brake processing 980 at L-position, the running speed V of the vehicle is read at 981, as shown in FIG. 25, and thereafter the torque ratio T is calculated from the running speed V and the number N of revolutions of input pulley using the following equation. (982) T ×N/Vxk where k represents the constant determined by the reduction ratio of the reduction gear mechanism 500 in the transmission, the final reduction ratio of the vehicle and the radius of tire. Next, discrimination 983 is made if the existing torque ratio T is greater than the torque ratio T* by which the safe and proper engine brake is obtained relative to the running speed, and if the condition T <T* is present, N is set at 984 to a value greater than N so as to provide downshift whereas if the condition T ≧T* is present, N* is set at 985 to a value equal to N and the step is returned. The torque ratio T* by which the safe and proper engine brake is obtained relative to each running speed is obtained by experiments or calculations with respect to each vehicle, which is shown by the graph in FIG. 26.

Next, operation of the reduction ratio control mechanism 80 and operation of downshift control mechanism 86 will be described with reference to FIGS. 27 to 33.

Constant speed running

Figure 27A:
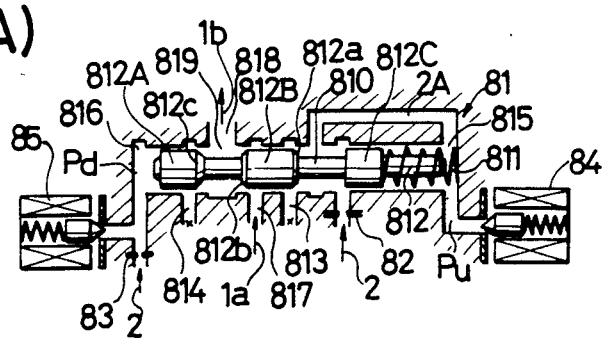
FIGS. 27A, 27B, and 27 are views explaining the operation of the reduction ratio control mechanism.
Figure 27B:
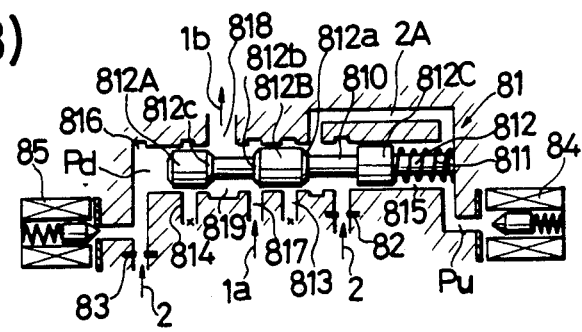

In the reduction ratio control mechanism 80, the solenoid valves 84 and 85 controlled by the output of the electric control circuit 90 are in OFF-position as shown in FIG. 27A. Then, the oil pressure Pd in the oil chamber 816 is in equilibrium with the line pressure. The oil pressure Pu in the oil chamber 815 also is in equilibrium with the line pressure while the spool 812 is at the right end position. Consequently, the spool 812 is moved toward the left end position by the resilient force of the spring 811. As the spool 812 is moved to the left, the oil chamber 815 is connected to the drain port 813 via the oil passage 2A and the oil chamber 810, so that the pressure Pu is exhausted, then, the spool 812 is moved to the right end position by the agency of the oil pressure Pd in the oil chamber 816. As the spool 812 is moved to the right, the drain port 813 is blocked. Accordingly, if the edge of the land 812B of the spool 812 on the side of the drain port 813 is tapered to form a taper surface 812a, the spool 812 can be retained more steadily at an intermediate position of equilibrium as shown in FIG. 27A.

With the spool retained at the intermediate position of equilibrium as shown in FIG. 27A, the oil passage 1a is closed and the oil contained in the hydraulic servomotor 530 of the input pulley 520 is compressed by the line pressure prevailing within the hydraulic servomotor 570 of the output pulley 560 through the V-belt 112 (FIG. 1a). Consequently, the oil pressure within the hydraulic servomotor 530 and that within the hydraulic servomotor 570 are equilibrated. Practically, since the oil leaks from the passage 1b, the input pulley 520 is expanded gradually and thereby the torque ratio T tends to increase. Accordingly, as shown in FIG. 27A, the leak from the passage 1b is supplemented by tapering the edge of the land 812B of the spool 812 on the side of the port 817 to form a taper surface 812b so that the drain port 814 is blocked while the port connected to the passage 1a is partly open with the spool 812 at the equilibrated position. Furthermore, smooth transient pressure rise in the passage 1b during pressure variation is attained by forming a taper surface in the edge of the land 812A on the side of the drain port 814. In this case, the working fluid of the line pressure is drained only from the drain port 813 via the orifice 82 and no other leak occurs.

Figure 29:
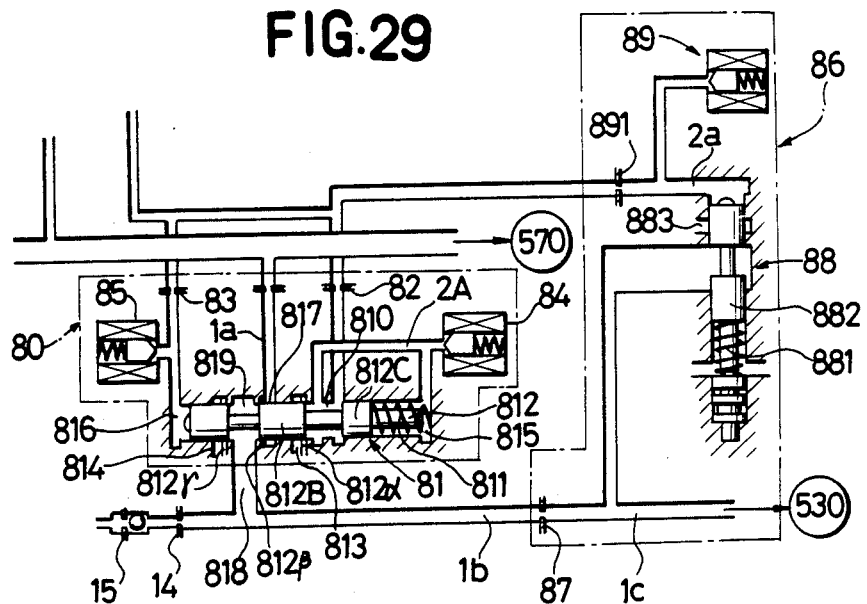
Figure 30:
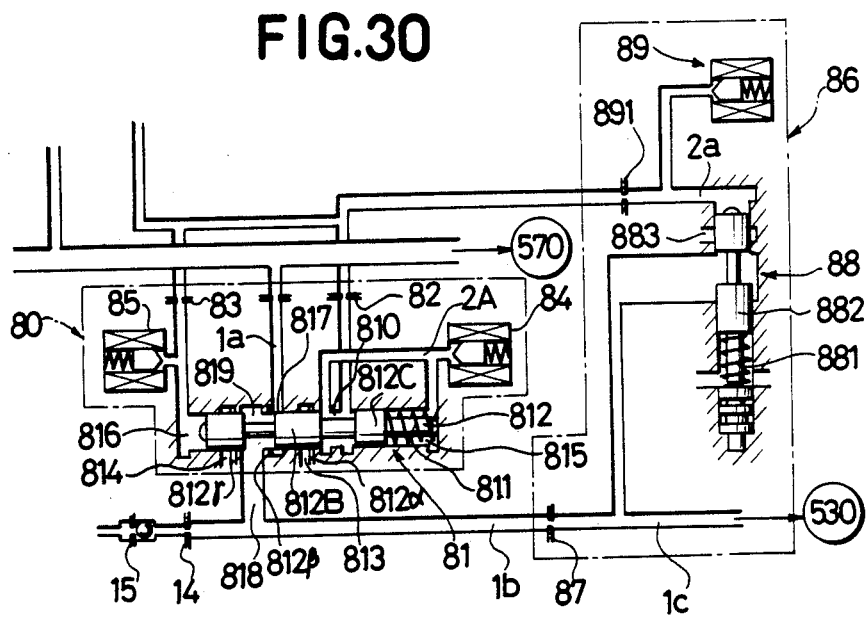

The similar effect can be obtained even by the provision of notches (812α, 812α, 812α) in the ports on the body side as shown in FIG. 29 in place of the aforesaid flat surfaces (812a, 812b, 812c).

In the downshift control mechanism 86, the solenoid valve 89 is in OFF position as shown in FIG. 29, the oil pressure of the oil passage 2a is in equibrium with the oil pressure of the oil passage 2, and the spool 882 of the downshift control valve 88 is set downwardly as shown to close the drain port 883, maintaining the oil pressure of the oil passage 1b in communication with the hydraulic servomotor 530.

Upshift operation

As shown in FIG. 19B, the upshift solenoid valve 84 is placed in ON-position to drain the oil chamber 815. Then, the spool 812 is moved to the right compressing the spring 811 and is placed finally at the right end position as shown in FIG. 19B.

In this state, since the line pressure in the passage 1a is supplied to the passage 1b through the port 818, the oil pressure within the hydraulic servomotor 530 rises, whereby the movable flange 520B of the input pulley 520 is moved toward the corresponding fixed flange 520A to reduce the torque ratio T. Thus, the torque ratio is reduced to a desired value by appropriately controlling the duration of ON-position of the solenoid valve 84 for upshift operation.

In the downshift control mechanism 86, the solenoid valve 89 is placed in OFF-position, the oil pressure of the oil passage 2a is in equibrium with the oil pressure of the oil passage 2, and the spool 882 of the downshift control valve 88 is set downwardly as shown to close the drain port 883, maintaining the oil pressure of the oil passage 1b in communication with the hydraulic servomotor 530.

Downshift operation

Figure 27C:
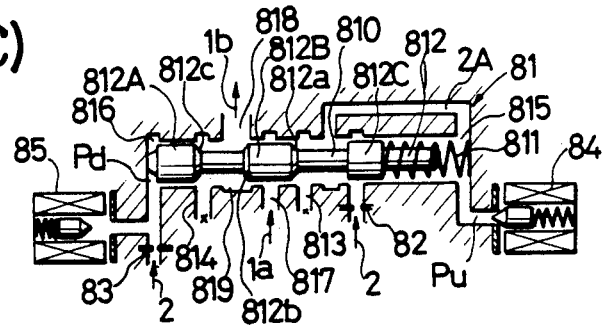

As shown in FIG. 27C, the downshift solenoid valve 85 is placed in ON-position to drain the oil chamber 816. Then, the spool 812 is moved quickly to the left by the agency of the resilient force of the spring 811 and the line pressure working within the oil chamber 815, whereby the passage 1b is connected to the drain port 814. Consequently, the hydraulic servomotor 530 is drained and then the movable flange 520B of the input pulley 520 is moved quickly away from the corresponding fixed flange 520A, so that the torque ratio is increased. Thus, the torque ratio is increased by appropriately controlling the duration of ON-position of the solenoid valve 85 for downshift operation.

Figure 28:
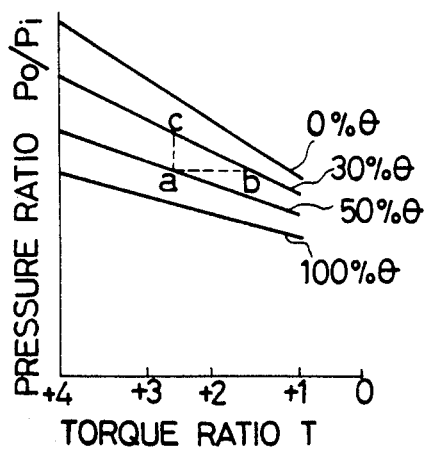
FIG. 28 is a graph for explanation of operation of the same.

Thus, the output pressure of the reduction ratio control valve 81 is supplied to the hydraulic servomotor 530 of the input pulley (driving pulley) 520, while the line pressure is supplied directly to the hydraulic servomotor 570 of the output pulley (driven pulley) 560 through the passage 1. Suppose that the oil pressure in the hydraulic servomotor 530 of the input pulley is $P_i$ and the oil pressure in the hydraulic servomotor 570 of the output pulley 560 is $P_o$, the ratio $P_o/P_i$ varies with torque ratio T as shown in FIG. 28. When the accelerator is released to some extent to make the degree of throttle opening $\theta = 30\%$ while the vehicle is running with the degree of throttle opening $\theta = 50\%$ and the torque ratio T = 1.5 (plot a), the operating mode of the transmission is changed to a mode indicated by plot b, where the torque ratio T = 0.87, when the pressure ratio $P_o/P_i$ is kept unchanged, whereas the pressure ratio $P_o/P_i$ is increased by the output of the reduction ratio control mechanism 80 controlling the input pulley to change the mode of operation to a mode indicated by plot c when the torque ratio T is kept at 1.5. As described hereinbefore, an optional torque ratio can be established corresponding to every load condition through the appropriate control of the pressure ratio $P_o/P_i$.

Figure 33:
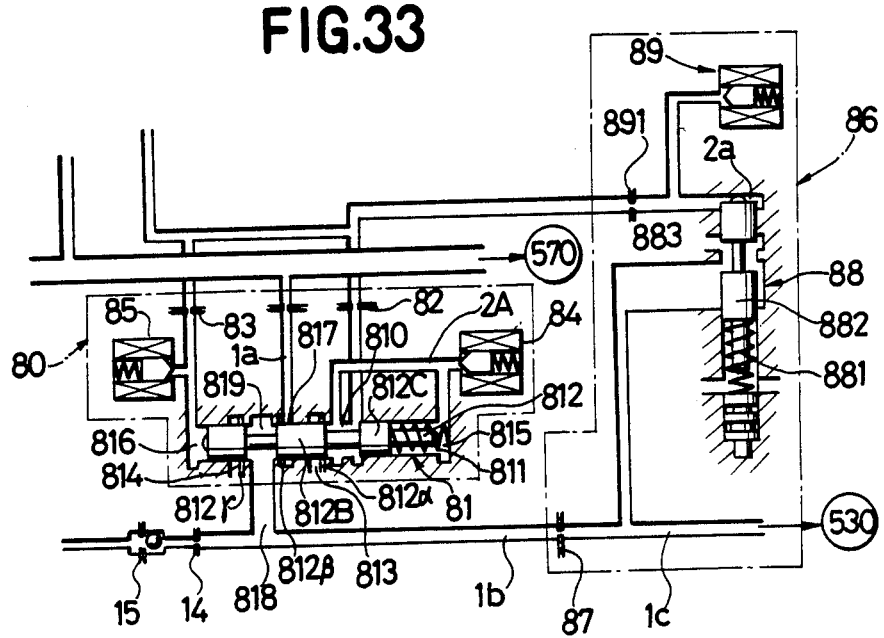

In the downshift control mechanism 86, at the time of kickdown, the solenoid valve 89 is placed in OFF-position as shown in FIG. 31, the oil pressure of the oil passage 2a is in equibrium with the oil pressure of the oil passage 2, the spool 882 of the downshift control valve 88 is set downwardly as shown to close the drain port 883, and the oil pressure of the oil passage 1c in communication with the hydraulic servomotor 530 is controlled by the reduction ratio control valve 81. At this time, the oil passage 1c is communicated with the drain port 814 through the oil passage 1b, and therefore, the oil pressure of the hydraulic servomotor 530 gradually drops while being restricted by the orifice 87. At the time of coastdown, the solenoid valve is placed in ON-position as shown in FIG. 32, and the oil pressure of the oil passage 2a is discharged. Thereby, the spool 882 of the downshift control valve 88 is displaced upwardly as shown by a spring load of the spring 881, the oil passage 1c is communicated with the drain port 883, and the oil pressure of the hydraulic servomotor 530 is rapidly discharged without through the orifice, to render the rapid downshift possible. Alternatively, in the reduction ratio control mechanism 80, as shown in FIG. 32, the upshift solenoid valve 84 can be placed in OFF-position and the downshift solenoid valve 85 in ON-position, and the oil passage 1b can be communicated with the drain port 814. Also, as shown in FIG. 33, both solenoid valves 84 and 85 can be placed in OFF-position to cut off communication between the oil passage 1b and the drain port 814. In the embodiment shown in FIG. 32, the speed of oil discharge of the hydraulic servomotor 530 further increases because of the action of both drain ports 883 and 814, and when both solenoid valves 84 and 85 are operated in the mode of OFF-position, there provides an effect in that a leak of pressure oil from the solenoid valve which is operated in the mode of ON-position to reduce the required capacity of the oil pump.

FIGS. 34 to 37 show another embodiments of the third and fourth inventions.

In the present embodiment, the orifice 87 is not inserted in the oil passage 1b supplies a working fluid to and discharges it from the hydraulic servomotor 530 of the input pulley. Instead, the drain port 814 of the reduction ratio control valve 81 is communicated with the inport 885 provided in the downshift control valve by the oil passage 1d, the discharge oil passage 1e is communicated with the drain port 886 provided in the downshift control valve 88, and the orifice 87 is inserted in the discharge oil passage 1e.

Figure 34:
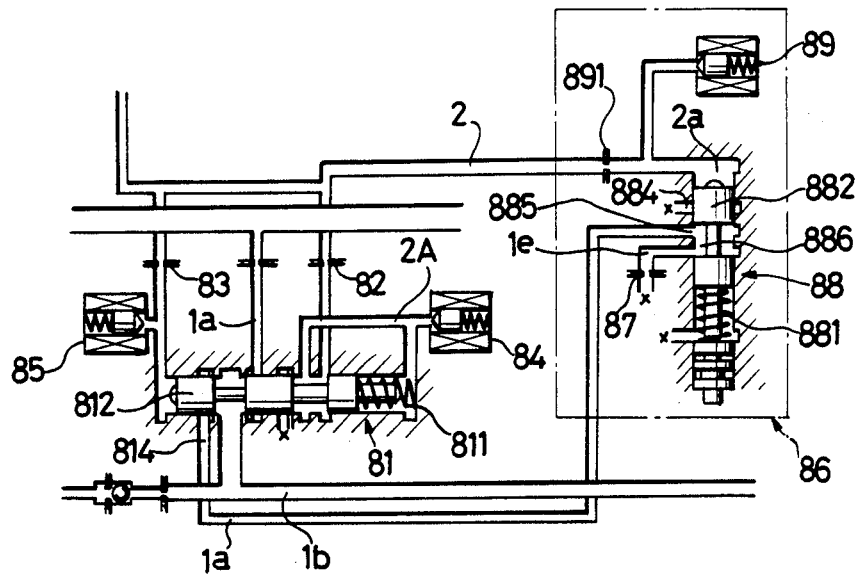

The downshift control mechanism 86 of the present embodiment operates as follows:

Constant speed running:

As shown in FIG. 34, both of two solenoid valves 84 and 85 in the reduction ratio control mechanism 80 are placed in OFF-position, the spool 812 of the reduction ratio control valve 81 is kept at an intermediate position to interrupt communication between the oil passage 1b and the oil passage 1d, and therefore, the oil pressure in the oil passage 1b is maintained at a fixed valve. The solenoid valve 89 of the downshift control mechanism 86 is placed in OFF-position, the oil pressure of the oil passage 2a is kept in equibrium with that of the oil passage 2, the spool 882 of the downshift control valve 88 is set downwardly as shown, and the inport 885 is communicated with the drain portion 886.

Figure 35:
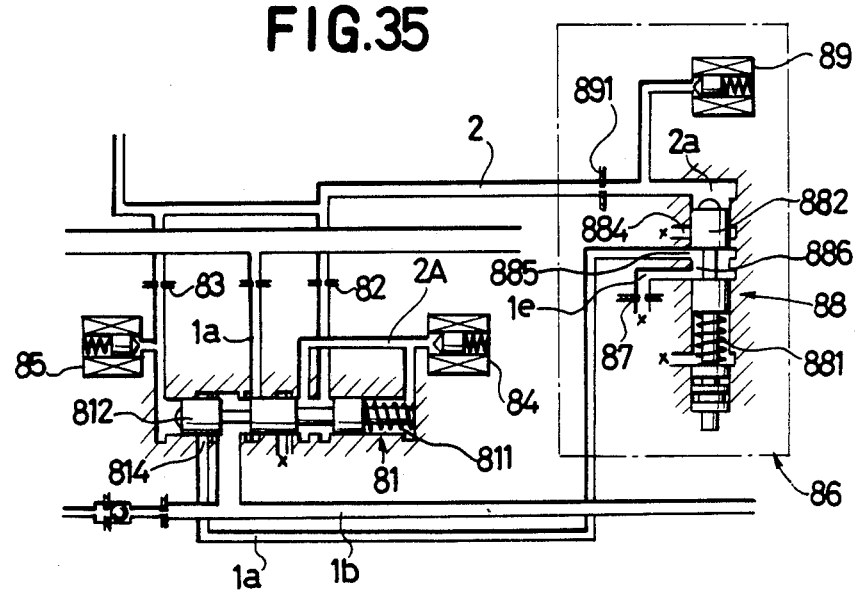

Upshift:

As shown FIG. 35, the upshift solenoid valve 84 of the reduction control mechanism 80 is placed in ON-position, the downshift solenoid valve 85 is placed in OFF-position, the spool 812 of the reduction ratio control valve 81 is set rightwards as shown to close the drain port 814, and the oil pressure of the oil passage 1b in communication with the hydraulic servomotor 530 is increased. The downshift control mechanism is in the same condition as that of the aforesaid constant running.

Figure 36:
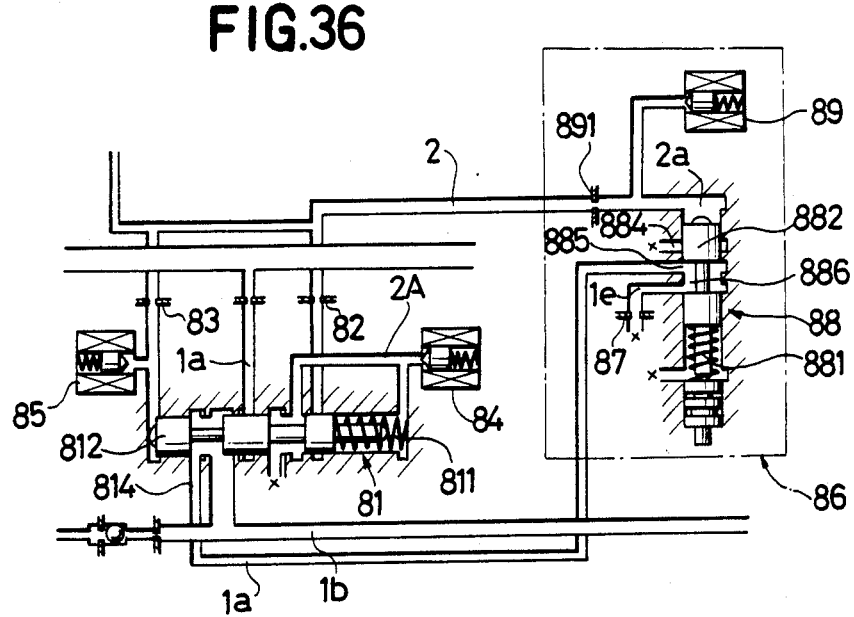

Kickdown shift:

As shown in FIG. 36, in the reduction ratio control mechanism 80, the downshift solenoid valve 85 is placed in ON-position, the upshift solenoid valve 84 is placed in OFF-position, and the spool 812 of the reduction ratio control valve 81 is set leftwards as shown to provide communication between the oil passage 1b and the oil passage 1d. The solenoid valve 89 of the downshift control mechanism 80 is placed in OFF-position, the oil pressure of the oil passage 2a is in a level equal to that of the oil pressure of the oil passage 2, and therefore, the spool 882 of the downshift control valve 88 is set downwardly as shown to provide communication between the oil passage 1d and the oil passage 1e. Thereby, the oil pressure of the hydraulic servomotor 530 is discharged in order of the oil passage 1b, oil passage 1d, oil passage 1e and orifice 87, and gradually drops while being subjected to restriction of the orifice 87.

Figure 37:
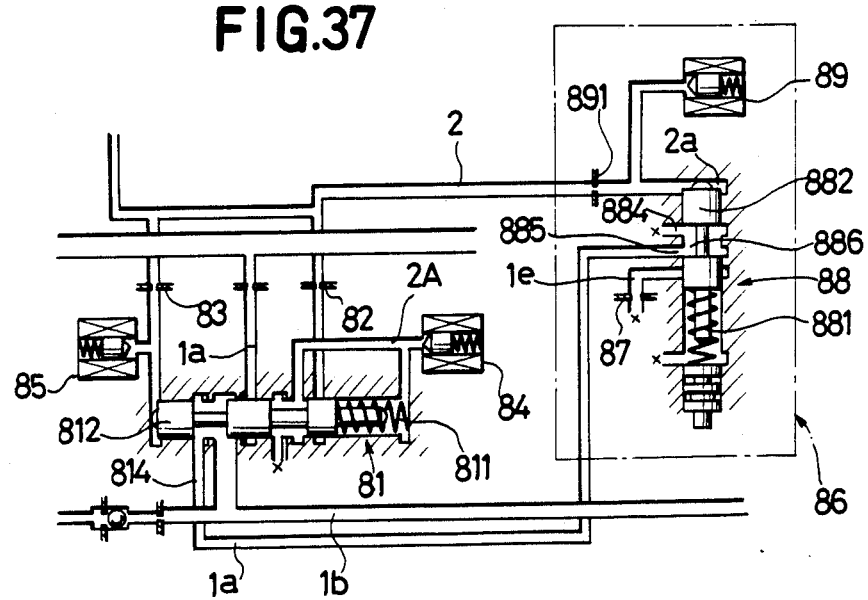

Coast downshift:

As shown in FIG. 37, in the reduction ratio control mechanism 80, the downshift solenoid valve 85 is placed in ON-position, the upshift solenoid valve 84 is placed in OFF-position, and the spool 812 of the reduction ratio control valve 81 is set leftwards as shown to provide communication between the oil passage 1b and the oil passage 1d. The solenoid valve 89 of the downshift control mechanism 80 is placed in ON-position to discharge the oil pressure of the oil passage 2a and therefore, the spool 882 of the downshift control valve 88 is set upwardly as shown and the oil passage 1d is communicated with the second drain port 884 provided in the downshift control valve 88. Thereby the oil pressure of the hydraulic servomotor 530 is discharged in order of the oil passage 1b, oil passage 1d and the drain port 804, and rapidly drops.

Figure 38:
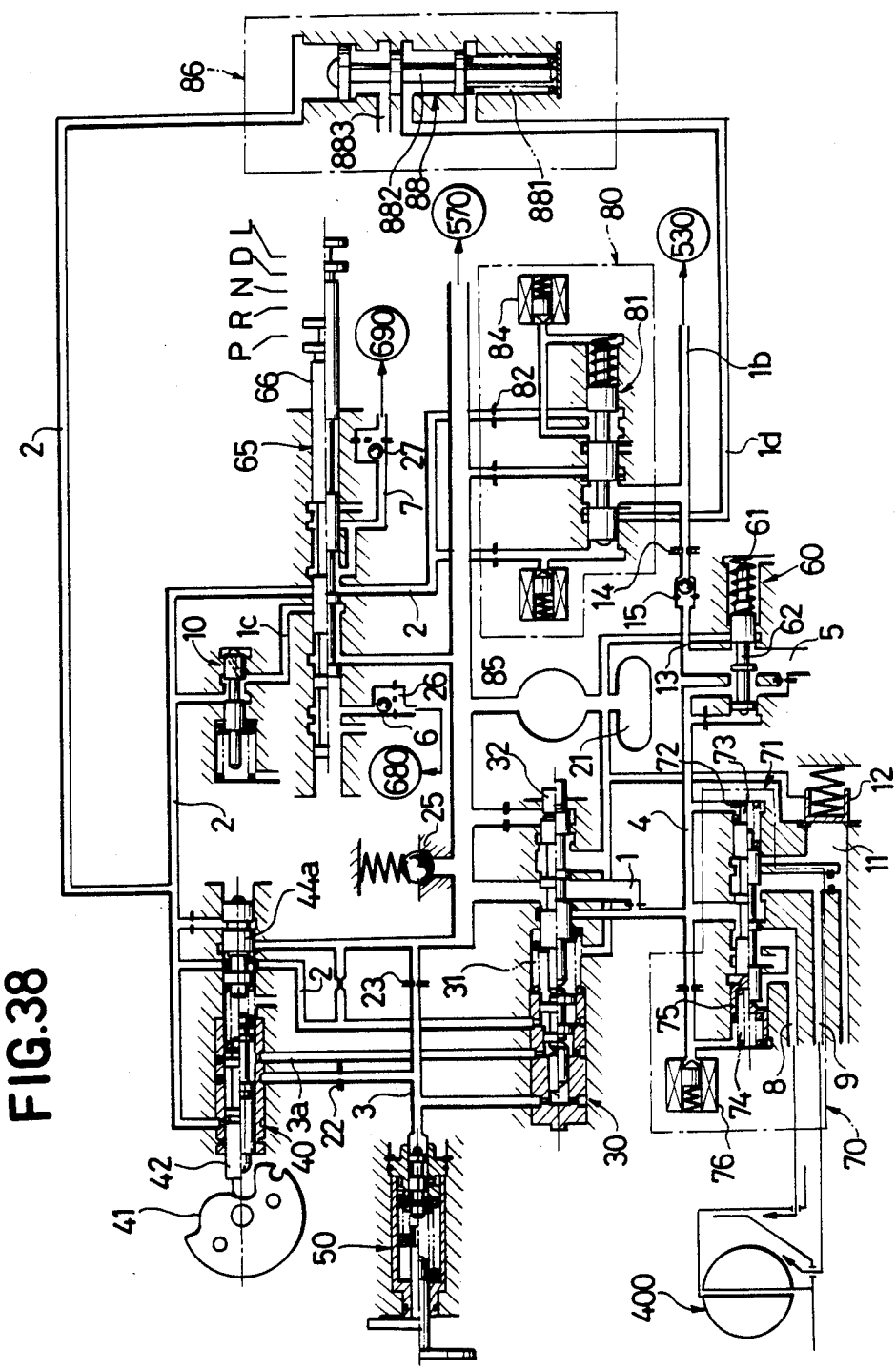
FIG. 38 is a hydraulic circuit view of a method and apparatus of controlling an automatic transmission for a vehicle in accordance with another embodiments of the present invention.

FIG. 38 shows the embodiments of the fifth and sixth inventions.

In the present invention, the downshift control valve 88 is provided with a spool 882 which is displaced with a throttle pressure Pth of the oil passage 2 applied to a land at the supper end as shown of an effective pressure receiving area A1 from one position (upward in the figure) and by receiving an oil pressure PM of the oil passage 1d and a spring load F3 of a spring 881 from the other position (downward in the figure) to provide communication and interruption thereof between the oil passage 1d and the drain port 883 in response to the amount of displacement of the spool 882.

In this embodiment, the spool 882 controls a level of discharge pressure from the input pulley during the downshift with respect to the degree of throttle opening θ in accordance with the following equibrium formula. Since the throttle pressure Pth has the characteristic as shown in FIG. 5, the oil pressure PM of the oil passage 1d is set to a low oil pressure when the degree of throttle opening θ is small, and set to a high oil pressure when the degree of throttle opening θ is large.

$$Pth \times A1 = PM \times A^2 + Fs$$

$$PM = (A1/A2)Pth - (Fs/A_2)$$

Accordingly, at the time of kickdown, the pressure discharge level from the input pulley can be kept high, and there occurs no slip between the belt and the pulley to realize the smooth downshift. At the coast downshift, the pressure discharge level from the input pulley is lowered, and therefore, the rapid downshift can be achieved. Since the oil pressure PM of the oil passage 1d is set to a level corresponding to the magnitude of the degree of throttle opening θ, it is possible to set the pressure discharge level suitable for the degree of the kickdown and coastdown to realize a proper downshift at all times.

As described above, in accordance with the method and apparatus of controlling the automatic transmission of the present invention, in the hydraulic control system which automatically varies in speed, in response to the running conditions of the vehicle, the belt drive continuously-variable transmission mechanism which comprises an input pulley and an output pulley which are mounted on an input shaft and an output shaft, respectively, and varied in effective diameter by the hydraulic servomotor, and a V-belt extended between both the pulleys, the discharge speed of the working oil from the hydraulic servomotor of the input pulley is restricted to prevent the excessive drop of the oil pressure in the hydraulic servomotor of the input pulley produced at the time of the kickdown shift to thereby prevent a slip between the V-belt and the pulley produced at the time of the kickdown, thus preventing the shock at the time of the kickdown.

Furthermore, the discharge speed of the working oil from the hydraulic servomotor of the input pulley is set to be small at the time of the kickdown while set to be high at the time of the coast downshift, whereby at the time of the kickdown shift, the oil pressure of the hydraulic servomotor of the input pulley is prevented from being excessively dropped to prevent a slip between the V-belt and the pulley at the time of the kickdown, and at the time of the coast downshift, the dropping speed of the oil pressure of the input pulley is made to be high and therefore, when the measure for preventing the shock at the time of the kickdown shift is taken, the positive downshift can be achieved before the vehicle stops when the vehicle stops due to the sudden coast downshift.

Moreover, the pressure discharge speed of the hydraulic servomotor of the input pulley is adjusted in response to the throttle pressure and the oil pressure of the discharge oil pressure of the hydraulic servomotor whereby the oil pressure PM of the oil passage 1d is set to a level corresponding to the magnitude of the degree of throttle opening θ to render setting of the pressure discharge level suitable for the degree of the kickdown and coastdown possible. With this, at the time of the kickdown, it is possible to maintain the pressure discharge level from the input pulley high at the time of the kickdown to produce no slip between the belt and the pulley, thus realizing the smooth downshift. In addition, since the pressure discharge level from the input pulley is lowered at the time of he coastdown, the rapid shiftdown can be achieved, thus realizing the proper downshift at all times.

What is claimed is:

1. In a hydraulic control system for controlling automatically, in response to the running conditions of a vehicle, a belt drive continuously-variable transmission for a vehicle having an input pulley and an output pulley mounted on an input shaft and an output shaft and varied in effective diameter by a hydraulic servomotor, and a V-belt extended between said both pulleys, the control system for a belt drive continuously-variable speed automatic transmission comprising a downshift control mechanism for restricting a quantity of flow is provided on a discharge passage of a working fluid from a hydraulic servomotor of the input pulley to restrict the discharge speed of the working fluid from the hydraulic servomotor of the input pulley, thereby preventing an excessive drop of the oil pressure in the hydraulic servomotor of said input pulley produced at the time of the kickdown to prevent a slip between the V-belt and the pulley.

2. A control system for a belt drive continuously-variable speed automatic transmission according to claim 1 wherein a downshift control mechanism comprises an orifice inserted in the discharge passage of the working fluid of the input pulley to the hydraulic servomotor.

3. In a hydraulic control system which automatically varies in speed, in response to the running conditions of a vehicle, a belt drive continuously-variable transmission comprising an input pulley and an output pulley mounted on an input shaft and an output shaft, respectively, and varied in effective diameter by a hydraulic servomotor, and a V-belt extended between said both pulleys, a control system for a belt drive continuously-variable speed automatic transmission for a vehicle characterized in that there is provided a downshift control mechanism comprising a flow restriction mechanism provided on a discharge passage of a working fluid from a hydraulic servomotor of the input pulley and a downshift control valve for communicating said discharge passage with a drain port directly without through said flow restriction mechanism, whereby at the time of kickdown shift, the oil pressure of the hydraulic servomotor of the input pulley is prevented from being excessively dropped, and at the time of coast downshift, the dropping speed of the oil pressure of the input pulley is increased to positively effect the termination of the downshift even at the sudden stop of the vehicle.

4. A control system for a belt drive continuously-variable speed automatic transmission according to claim 3 wherein the flow restriction mechanism comprises an orifice inserted in the discharge passage of the working fluid of from the hydraulic servomotor of the input pulley.

5. A control system for a belt drive continuously-variable speed automatic transmission according to claim 3, wherein the downshift comprises a flow control valve having a first orifice and a second orifice with a check valve provided in parallel with the first orifice provided in the discharge passage of the working fluid from the hydraulic servomotor of the input pulley.

6. A control system for a belt drive continuously-variable speed automatic transmission according to claim 3 wherein the downshift control valve comprises a spool which is displaced by receiving the control pressure of a solenoid valve controlled by a downshift controlling solenoid valve from one position and by receiving a spring load of a spring from the other position, said downshift control valve being controlled by said solenoid valve.

7. In a hydraulic control system for controlling automatically, in response to the running conditions of a vehicle, a belt drive continuously-variable transmission for a vehicle having an input pulley and an output pulley mounted on an input shaft and an output shaft, respectively, and varied in effective diameter by a hydraulic servomotor, and a V-belt extended between said both pulleys, the control system for a belt drive continuously-variable speed automatic transmission comprising a downshift valve provided with a spool which is applied with a throttle pressure from one position and displaced by receiving the discharge oil pressure of a hydraulic servo-motor of the input pulley and a spring load of a spring from the other position to adjust communication between a discharge oil passage of the hydraulic servomotor of the input pulley and a drain port, whereby the discharge pressure speed of the hydraulic servomotor of the input pulley is adjusted in response to the throttle pressure and the oil pressure of the discharge oil passage of the hydraulic servomotor of the input pulley.

* * * * *

UNITED STATES PATENT AND TRADEMARK OFFICE
CERTIFICATE OF CORRECTION

PATENT NO. : 4,547,178
DATED : October 15, 1985
INVENTOR(S) : Yoichi Hayakawa et al It is certified that error appears in the above—identified patent and that said Letters Patent is hereby corrected as shown below:

At [73] change "Fuji Medical Instruments Mfg. Co., Ltd., Osaka, Japan" to --AISIN WARNER KABUSHIKI KAISHA, Aichi, Japan--.

Signed and Sealed this

Eighteenth Day of February 1986

[SEAL]

Attest:

DONALD J. QUIGG

Attesting Officer

Commissioner of Patents and Trademarks